US 10,762,591 B2

United States Patent
Schultz et al.

(10) Patent No.: US 10,762,591 B2
(45) Date of Patent: Sep. 1, 2020

(54) ENGAGEMENT-BASED ROUTING IN GEOGRAPHIC ROUTING SYSTEMS

(71) Applicant: GT Gettaxi Limited, Limassol H.E. (CY)

(72) Inventors: Tamar Schultz, Rehovot (IL); Nir Waysbort, Ramat Gan (IL); Oz Eigerman, Nes Tziona (IL)

(73) Assignee: GT GETTAXI LIMITED, Limassol, H.E. (CY)

(*) Notice: Subject to any disclaimer, the term of this patent is extended or adjusted under 35 U.S.C. 154(b) by 623 days.

(21) Appl. No.: 15/369,341

(22) Filed: Dec. 5, 2016

(65) Prior Publication Data

US 2017/0161860 A1 Jun. 8, 2017

Related U.S. Application Data

(60) Provisional application No. 62/264,493, filed on Dec. 8, 2015.

(51) Int. Cl.
*G06Q 50/30* (2012.01)
*G06Q 10/06* (2012.01)
(Continued)

(52) U.S. Cl.
CPC ......... *G06Q 50/30* (2013.01); *G01C 21/3697* (2013.01); *G06Q 10/06311* (2013.01);
(Continued)

(58) Field of Classification Search
CPC ............. G06Q 50/30; G06Q 10/06311; G06Q 30/0207; G06Q 30/0231; G06Q 30/0601;
(Continued)

(56) References Cited

U.S. PATENT DOCUMENTS 8,484,199 B1 * 7/2013 Katragadda ......... G06F 16/9537
707/723
9,135,759 B2 9/2015 Baer et al.
(Continued)

FOREIGN PATENT DOCUMENTS

EP 2 273 468 A1 1/2011
EP 2 843 598 A1 3/2015
(Continued)

OTHER PUBLICATIONS

Don Torrieri, Performance Comparisons of Geographic Routing Protocols in Mobile Ad Hoc Networks, 2015 (Year: 2015).*
(Continued)

*Primary Examiner* — Tarek Elchanti
(74) *Attorney, Agent, or Firm* — Lowenstein Sandler LLP

(57) ABSTRACT

Systems and methods for engagement-based routing transportation services are disclosed. A method includes establishing a communication session between a server computing device, client computing device, and plurality of geographic routing entities. The method further includes receiving a request for the geographic routing system from the client computing device. The method further includes identifying ones of the geographic routing entities within a determined geographic distance of the client computing device and obtaining a plurality of scores and a plurality of geographic distances from the client computing device. The method further includes transmitting the request to one or more of the identified geographic routing entities. The method further includes receiving acceptances of the request from at least a subset of the identified geographic routing entities. The method further includes selecting a geographic routing entity from the subset based on the plurality of scores and the plurality of geographic distances.

18 Claims, 17 Drawing Sheets

(51) Int. Cl.
*G06Q 30/02* (2012.01)
*G07B 15/06* (2011.01)
*G06Q 30/06* (2012.01)
*G01C 21/36* (2006.01)
*H04L 29/08* (2006.01)
*H04L 29/06* (2006.01)

(52) U.S. Cl.
CPC ..... *G06Q 30/0207* (2013.01); *G06Q 30/0231* (2013.01); *G06Q 30/0601* (2013.01); *G07B 15/063* (2013.01); *H04L 67/141* (2013.01); *H04L 67/16* (2013.01); *H04L 67/18* (2013.01); *H04L 67/32* (2013.01); *H04L 67/42* (2013.01)

(58) Field of Classification Search
CPC . G01C 21/3697; G07B 15/063; H04L 67/141; H04L 67/16; H04L 67/18; H04L 67/32; H04L 67/42
USPC .............. 705/14.31, 14.13, 6; 707/728, 723; 701/533, 410; 1/1
See application file for complete search history.

(56) References Cited

U.S. PATENT DOCUMENTS

| | | |
|---|---|---|
| 2011/0099040 A1 | 4/2011 | Felt et al. |
| 2011/0153453 A1 | 6/2011 | Ghafoor et al. |
| 2013/0345961 A1* | 12/2013 | Leader .................. G01C 21/20 701/410 |
| 2014/0163849 A1 | 6/2014 | Adam et al. |
| 2014/0195272 A1 | 7/2014 | Sadiq et al. |
| 2015/0006526 A1* | 1/2015 | Duleba .................. G06F 16/29 707/728 |
| 2015/0081404 A1 | 3/2015 | Basir |
| 2015/0323337 A1* | 11/2015 | Aiello .................... G01C 21/36 701/533 |
| 2015/0324717 A1* | 11/2015 | Lord ................ G06Q 10/06311 705/7.13 |
| 2015/0371157 A1* | 12/2015 | Jaffe .................... G06Q 10/025 705/6 |
| 2017/0060888 A1* | 3/2017 | Al Hassanat ......... H04W 4/023 |

FOREIGN PATENT DOCUMENTS

| | | | |
|---|---|---|---|
| RU | 2008 103 703 A | 8/2009 | |
| WO | WO-2004095214 A2 * | 11/2004 | ......... G06Q 30/0275 |
| WO | 2013/064861 A1 | 5/2013 | |

OTHER PUBLICATIONS

Russian Search Report dated Apr. 23, 2018, on application No. 2016147927/08.

European Search Report dated Feb. 15, 2017, on application No. 16203020.9-1871.

* cited by examiner

700

Determine that an event has occurred to cause calculation of a score of a geographic routing device
710

Determine values of one or more input parameters used in the calculation of the score
720

Determine weighted values to apply to each of the one or more input parameters
730

Calculate the score using the determined weighted values
740

Provide visual indication of the calculated score for display to the geographic routing entity via a graphical user interface (GUI)
750

```
Establish a communication system, over a network, between a server computing
device, a client computing device, and geographic routing entities
                                                                          810
                                    ↓
Receive a request for the geographic routing system from the client computing
                                  device
                                                                          820
                                    ↓
  Identify ones of the geographic routing entities with a determined geographic
                    distance of the client computing device
                                                                          830
                                    ↓
        Obtain scores and geographic distances from the client computing device
                                                                          840
                                    ↓
    Transmit the request to one or more of the identified geographic routing entities
                                                                          850
                                    ↓
     Receive acceptances of the request from at least a subset of the identified
                           geogrpahic routing entities
                                                                          860
                                    ↓
    Select a chosen geographic routing entity from the subset based on the scores
                          and the geographic distances
                                                                          870
```

FIG. 8

ENGAGEMENT-BASED ROUTING IN GEOGRAPHIC ROUTING SYSTEMS

RELATED APPLICATIONS

This application claims the benefit of U.S. Provisional Application No. 62/264,493, filed Dec. 8, 2015, the entire contents of which are hereby incorporated by reference herein.

TECHNICAL FIELD

This disclosure relates to geographic routing systems and, in particular, to engagement-based routing in geographic routing systems.

BACKGROUND

Geographic routing systems (e.g., transportation services, ridesharing services, taxi services, etc.) are often provided over a network via smart phone application interfaces. The interfaces may allow client computing devices to transmit a request for a pick-up by a geographic routing entity (e.g., driver of a transportation vehicle), cancel the request, book future transportation requests, and provide payment for the service.

BRIEF DESCRIPTION OF THE DRAWINGS

The disclosure is illustrated by way of example, and not by way of limitation, in the figures of the accompanying drawings, in which:

FIG. 7 is a flow diagram illustrating a method for determining a score for a geographic routing entity of a geographic routing system, in accordance with an implementation of the disclosure;

FIG. 8 is a flow diagram illustrating a method for using a score for engagement-based routing in a geographic routing system, in accordance with an implementation of the disclosure;

DETAILED DESCRIPTION

Figure 1:
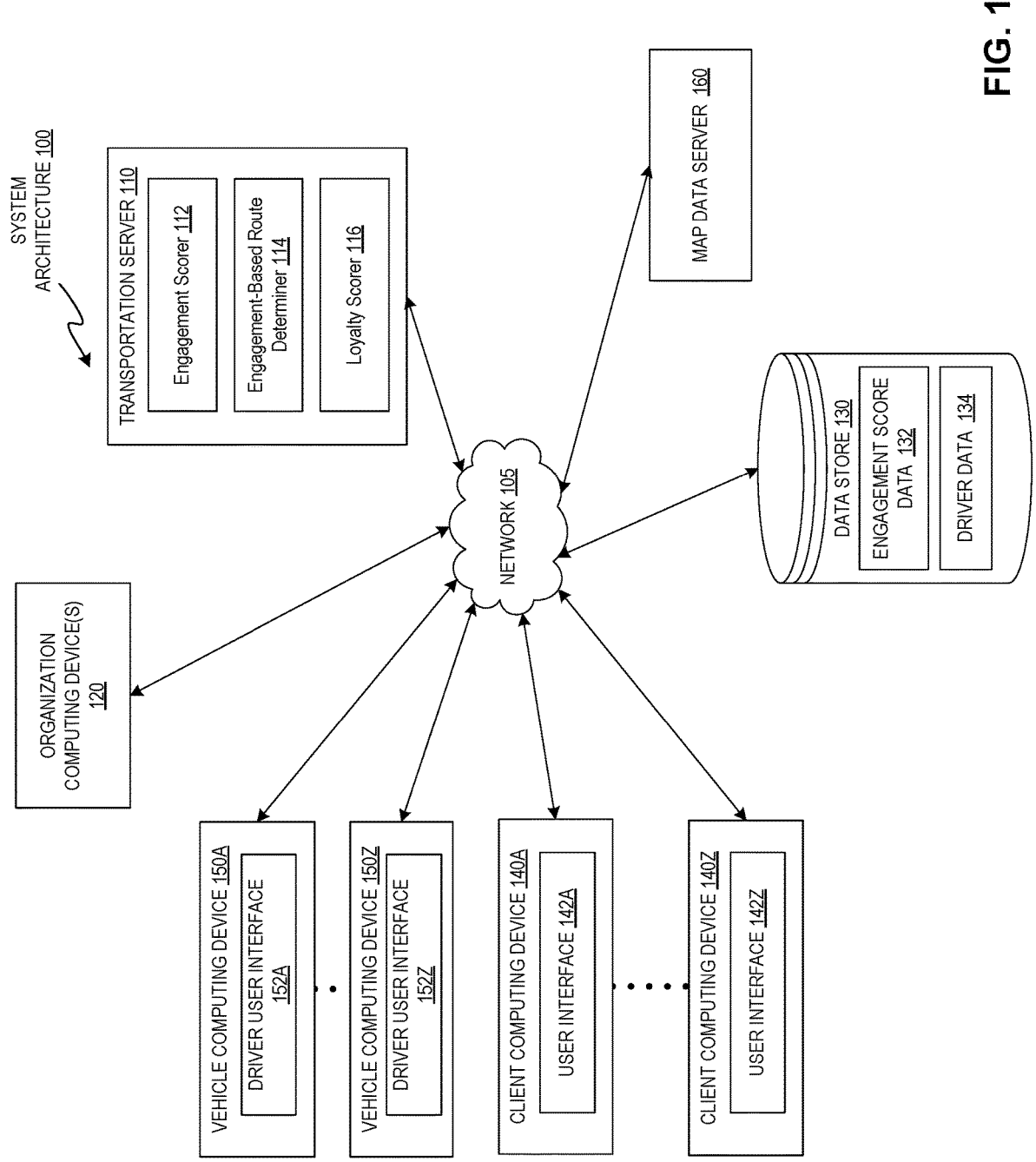
FIG. 1 illustrates an example system architecture 100, in accordance with an implementation of the disclosure.

Geographic routing systems transmit requests from client computing devices for a geographic routing entity (e.g., requests for a ride) to geographic routing entities that have an available status. The geographic routing entities can set the status of the geographic routing entity to unavailable or offline, can accept the request, can ignore the request, or can reject the request. Lack of geographic routing entities that are engaged and loyal to the geographic routing system results in less geographic routing entities that are available and fulfilling requests on the geographic routing system (e.g., less acceptance of requests on the geographic system). Less geographic routing entities that are available and fulfilling requests can result in a request not being accepted, a request being accepted only after a threshold amount of time (e.g., 30 minutes) has passed, or a geographic routing entity that accepted taking greater than a threshold amount of time to arrive at the client computing device (e.g., being a far geographic distance away), which results in an unsatisfactory user experience associated with the client computing device.

Traditional geographic routing systems (e.g., organizations that provide transportation services) often struggle with incentivizing the geographic routing entities (e.g., drivers) that work with them to provide more services, such as accepting more requests to provide rides to users of the geographic routing system.

Described herein are systems and methods for implementing engagement-based routing and loyalty programs for a geographic routing system (e.g., transportation service). Implementations of the disclosure encourage geographic routing entities (e.g., drivers) to accept more rides, and work more with a geographic routing system by introducing features including determining an engagement score per geographic routing entity that impacts the geographic routing entity's chance to obtain an accepted request from a client computing device (e.g., to provide a ride to a user). Implementations of the disclosure also provide a loyalty program to reward geographic routing entities for fulfilling a request from the client computing device by incrementing a first count over a first period of time and a second count over a second period of time (e.g., reward based on completed rides in the short and long term). The first period of time (e.g., short term, daily) includes a daily target and rewards on fulfilled requests (e.g., completed rides). The second period of time (e.g., long term, monthly) includes a monthly target and rewards on fulfilled requests.

Implementations of the disclosure improve geographic routing systems (e.g., transportation services) by increasing acceptances of requests by the geographic routing entity (e.g., driver acceptance rates), increasing total number of fulfilled requests (e.g., rides given), increasing available status of the geographic routing entity per day (e.g., "available time" per driver per day), and increasing supply during peak times (e.g., low supply of geographic routing entities, high demand for geographic routing entities, etc.). Implementations of the disclosure provide the above improvements by providing gamification and habit-forming features that introduce immediate feedback to actions (e.g., interactions), penalties and rewards. These features are effective in encouraging and discouraging certain behaviors in order to increase supply of geographic routing entities, and improve accepted and fulfilled requests (e.g., completed rides) during regular time as well as high demand and/or low supply times for geographic routing systems.

It is noted that implementations for engagement-based routing and loyalty programs for a geographic routing system are illustrative, and that other methods of carrying out the described implementations may be used.

A system of geographic routing systems provided by establishing a communication session, over a network, between a server computing device, a client computing device, and one or more geographic routing entities also has technological advantages. The technological advantages may include one or more of increased flexibility, faster search times, smaller memory requirements, reduced processing times, reduced bandwidth latency, increased efficiency, etc. as further described in conjunction with FIG. 1.

In one aspect of the disclosure, a method includes establishing a communication session, over a network, between a server computing device including a processing device, a client computing device, and a plurality of geographic routing entities and providing a geographic routing system for the client computing device and the plurality of geographic routing entities. The server computing device receives, via the communication session, a request received from the client computing device for the geographic routing system and identifies ones of the geographic routing entities within a determined geographic distance of the client computing device. The server computing device further obtains a plurality of scores and a plurality of geographic distances from the client computing device, each of the identified geographic routing entities corresponding to one of the plurality of scores and one of the plurality of geographic distances, where each of the plurality of scores is based on parameters measuring a level of engagement of a corresponding geographic routing entity with the geographic routing system, where the level of engagement is based on interactions of the geographic routing entity with the geographic routing system. The server computing device further transmits, via the communication session, the request to one or more of the identified geographic routing entities and receives, via the communication session, acceptances of the request from at least a subset of the identified geographic routing entities. The server computing device further selects, by the processing device, a chosen geographic routing entity from the subset based on the plurality of scores and the plurality of geographic distances.

In one implementation, the transmitting the request to the one or more of the plurality of geographic routing entities is based on the plurality of scores and the plurality of geographic distances. In one implementation, the selecting of the geographic routing entity from the subset occurs during a period of high demand or low supply of the plurality of geographic routing entities. In one implementation, obtaining a score for an identified geographic routing entity is based on one or more of: average number of rides given by the identified geographic routing entity per day; acceptances of requests by the identified geographic routing entity per day; ignoring of requests by the identified geographic routing entity per day; rejections of requests by the identified geographic routing entity per day; available status of the identified geographic routing entity per day; busy status of the identified geographic routing entity per day; offline status of the identified geographic routing entity per day; in-ride status of the identified geographic routing entity per day; average number of geographic routing entities who obtain a daily bonus; or correlation of cumulative cost of bonuses to overall rides revenue.

In one implementation, a score is reset after a corresponding geographic routing entity has an offline status for a threshold amount of time. In one implementation, the method further includes receiving, via the communication session from a geographic routing entity, an acceptance of the request; and transmitting, via the communication session, data to the geographic routing entity to display an increased score in response to the acceptance. In one implementation, the method further includes receiving, via the communication session from the chosen geographic routing entity, at least one of a first indication that the request is ignored or a second indication that the request is rejected; and transmitting, via the communication session, data to the chosen geographic routing entity, the data to cause a decreased score to be displayed in response to the at least one of the first indication or the second indication.

An apparatus includes a memory; a processing device, coupled to the memory, the processing device to: establish a communication session, over a network, between a server computing device, a client computing device, and a geographic routing entity, the server computing device providing a geographic routing system for the client computing device and the geographic routing entity; receive, by the processing device via the communication session from the client computing device, a request for the geographic routing system; transmit, via the communication session, the request to the geographic routing entity; receive, via the communication session from the geographic routing entity, a first indication that the geographic routing entity fulfilled the request; responsive to receiving the first indication, incrementing a first count and a second count of the geographic routing entity, where the first count is over a first period of time and the second ride count is over a second period of time; responsive to the first count meeting a first threshold value, transmit, via the communication session to the geographic routing entity, first data to cause a second indication to be displayed on a user interface of the geographic routing entity; and responsive to the second count meeting a second threshold value, transmit, via the communication session to the geographic entity, second data to cause a third indication to be displayed on the user interface.

In one implementation, the processing device is to implement a daily bonus including giving the daily bonus for each ride given by the geographic routing entity during a calendar day in response to the first counting meeting the first threshold value during the calendar day. In one implementation, the processing device is further to transmit data to the geographic routing entity to display a daily bonus progress bar including a first number of rides completed and a second number of rides required to reach the daily bonus value. In one implementation, the processing device further to implement the daily bonus for all geographic routing entities in a geographic region responsive to demand of geographic routing entities exceeding a third threshold value in the geographic region or supply of the geographic routing entities being below a fourth threshold value in the geographic region.

In one implementation, the processing device is further to implement a monthly bonus including giving the monthly bonus for each ride given by the geographic routing entity during a second calendar month following a first calendar month in response to the second count meeting the second threshold during the first calendar month. In one implementation, the processing device is further to transmit data to the geographic routing entity to display a monthly bonus bar including a first number of rides completed and a second number of rides required to reach the monthly bonus value responsive to the loyalty score of the geographic routing entity equaling or exceeding the daily bonus value.

FIG. 1 illustrates an example system architecture 100, in accordance with an implementation of the disclosure. The system architecture 100 includes a transportation server 110, organization computing device 120, a data store 130, vehicle computing devices 150A-150Z (e.g., geographic routing entities), client computing devices 140A-140Z, and a map data server 160. The components 110-160 may be communicatively connected via a network 105, which is described in greater detail below.

In one implementation, the transportation server 110 and the map data server 160 may each correspond to one or more computing devices (e.g., a rackmount server, a router computer, a server computer, a personal computer, a mainframe computer, a laptop computer, a tablet computer, a desktop computer, a mobile device, etc.), data stores (e.g., hard disks, memories, databases), networks, software components, and/or hardware components. The transportation server 110 may include an engagement scorer 112, an engagement-based route determiner 114, and a loyalty scorer 116 (which each may be executed by a processing device of the transportation server 110) that are capable of implementing engagement-based routing and loyalty programs for a geographic routing system (e.g., an organization that provides transportation services). The transportation server 110 may also be capable of transmitting order requests (e.g., received from a client computing device 140) to the vehicle computing devices 150A-150Z, dispatching geographic routing entities (e.g., transportation vehicles, taxis), and performing location tracking of the geographic routing entities.

In some implementations, the engagement scorer 112, the engagement-based route determiner 114, and the loyalty scorer 116 may each be implemented on a different device than transportation server 110. For example, in some implementations, one or more of the organization computing devices 120 and/or client computing devices 140A-140Z may implement the engagement scorer 112, engagement-based route determiner 114, and/or loyalty scorer 116 (or at least some of the functionality of these components). In some implementations, some or all of the functionality of the engagement scorer 112, the engagement-based route determiner 114, and the loyalty scorer 116 may be distributed across one or more of the organization computing devices 120, one or more of the client computing devices 140A-140Z, and/or one or more of the vehicle computing devices 150A-150Z. In some implementations, the transportation server 110 may be omitted from the system architecture 100. In some implementations, more than one transportation server 110 may be included in the system architecture 100.

A communication session may be established over network 105, between transportation server 110, client computing devices 140A-140Z, and vehicle computing devices 150A-150Z. Information (e.g., data transmitted in packet format) can be received and transmitted over network 105 between one or more of the transportation server 110 (e.g., engagement scorer 112, engagement-based route determiner 114, loyalty scorer 116), vehicle computing device 150, client computing device 140, data store 130, map data server 160, and so forth. This configuration over network 105 can provide one or more of increased flexibility, faster search times, smaller memory requirements, reduced processing times, reduced bandwidth latency, increased efficiency, etc. In one implementation, one or more of the network devices (e.g., transportation server 110, client computing devices 140A-140Z, data store 130, vehicle computing devices 150A-150Z, map data server 160, etc.) has smaller memory requirements because the memory requirements are distributed among the network devices.

In one implementation, one or more of the network devices has one or more of increased flexibility, increased efficiency, or reduced processing times because the functions of the transportation system are distributed among the network devices. In one implementation, the transportation server 110 can more quickly fulfill a request for a geographic routing entity from a client computing device 140 because of the selecting of a geographic routing entity via the transportation server 110. The transportation server 110 may more quickly provide a request to a geographic supply entity because of the selecting of the geographic routing entity. In one implementation, one or more of the network devices prefetch data (e.g., transfer data from main memory to temporary storage in readiness for later use) based on one or more of selecting the geographic routing entity, engagement score of the geographic routing entity, geographic distance between the geographic routing entity and the client computing device 140, and so forth to provide faster request fulfillment, faster providing of requests, increased efficiency, reduced bandwidth latency, and so forth.

In one implementation, the map data server 160 includes map data for a variety of locations (e.g., city maps), as well as real-time traffic conditions, detours (e.g., due to construction), etc. The map data server 160 may provide map data to one or more devices within the system architecture 100 via the network 105. In some implementations, the transportation server 110 may receive map data from the map data server 160, which may be used to compute an estimated time of arrival (ETA) for a geographic routing entity to arrive at a particular location.

In one implementation, organization computing devices 120 may include computing devices such as server devices, personal computers (PCs), laptops, mobile phones, smart phones, tablet computers, netbook computers, etc. Organization computing devices 120 may be used by an organization or company as part of performing the business of the organization.

Client computing devices 140A-140Z may include computing devices such as personal computers (PCs), laptops, mobile phones, smart phones, tablet computers, netbook computers, etc. The client computing devices 140A-140Z may also be referred to as "user devices." An individual user may be associated with (e.g., own and/or use) one or more of the client computing devices 140A-140Z, and the client computing devices 140A-140Z may each be owned and utilized by different users at different locations. As used herein, a "user" may refer generally to an individual operator of one or more of the client computing devices 140A-140Z and/or organization computing devices 120, as well as one or more of the vehicle computing devices 150A-150Z (e.g., a driver of a transportation vehicle, geographic routing entities).

The organization computing devices 120 and the client computing devices 140A-140Z may each implement one of user interfaces 142A-142Z. In some implementations, the user interfaces 142A-142Z may allow their respective organization computing devices 120 or client computing devices 140A-140Z to interact directly with the transportation server 110. For example, an order request for a transportation vehicle (e.g., request for the geographic routing system) may be transmitted from the organization computing devices 120 or client computing device 140A to the transportation server 110, along with location information pertaining to the organization computing device 120 or client computing device 140A.

The organization computing devices 120 and the vehicle computing devices 150A-150Z may each implement one of driver user interfaces 152A-152Z. In some implementations, the driver user interfaces 152A-152Z may allow their respective organization computing devices 120 or vehicle computing devices 150A-150Z to interact directly with the transportation server 110. For example, an acceptance of a request for a geographic routing system received from the client computing device may be transmitted from the organization computing devices 120 or vehicle computing device 150A to the transportation server 110, along with location information pertaining to the organization computing device 120 or vehicle computing device 150A.

Each of driver user interfaces 152A-152Z may allow a user of the respective organization computing devices 120 or a geographic routing entity of vehicle computing device 150A-150Z to implement engagement-based routing and loyalty programs via the transportation server 110. In one implementation, one or more of the driver user interfaces 152A-152Z may be a standalone application (e.g., a mobile app), which may have been provided by the transportation server 110 (e.g., as a downloadable application to be installed by an administrator), that allows a geographic routing entity to send and receive information to the transportation server 110. In another example, one or more of the driver user interfaces 152A-152Z may be a web browser interface that can access, retrieve, present, and/or navigate content (e.g., web pages such as Hyper Text Markup Language (HTML) pages) provided by the transportation server 110. The driver user interfaces 152A-152Z and their functionality are described in greater detail with respect to FIGS. 2 and 4-6.

In one implementation, a transportation order is placed (e.g., a request is transmitted) from the client computing device 140A-140Z using an order screen. In some implementations, the client computing device 140A-140Z may include a global positioning system (GPS) tracking device, which can determine a location of the client computing device 140A-140Z for purposes of pre-filling a location in the order screen. The transportation order may then be routed to the transportation server 110, which, in turn, communicates the transportation order to one or more vehicle computing device 150A-150Z.

In one implementation, the vehicle computing devices 150A-150Z may be computing devices (e.g., "driver boxes") that are located on-board geographic routing entities (e.g., as built-in computing devices or separate/portable devices operated by drivers of the transportation vehicles). The vehicle computing devices 150A-150Z may include computing devices such as personal computers (PCs), laptops, mobile phones, smart phones, tablet computers, netbook computers, etc. The vehicle computing devices 150A-150Z may have some or all of the functionality of each of the client computing devices 140A-140Z, and may be configured to exchange data with each other as well as with the transportation server 110, the data store 130, the client computing devices 140A-140Z, and the map data server 160.

A geographic routing entity (e.g., a transportation vehicle) corresponding to one of vehicle computing devices 150A-150Z may receive order requests (e.g., request for the geographic routing system received from the client computing device), accept order requests, decline order requests, and/or transfer order requests to other geographic routing entities (e.g., other drivers operating vehicle computing devices 150A-150Z). In one implementation, the vehicle computing devices 150A-150Z may include GPS tracking devices for tracking locations of their respective geographic routing entities (e.g., transportation vehicles). Location data generated by the GPS tracking devices may be transmitted to the transportation server 110 and utilized, for example, to compute estimate times of arrival.

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to one or more of the organization computing devices 120, the transportation server 110, one or more of the client computing devices 140A-140Z, one or more of the vehicle computing devices 150A-150Z, and/or the map data server 160. One or more of the devices of the system architecture 100 may utilize the data store 130 to store public and private data. The data store 130 may be configured to provide secure storage for private data.

In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks. In one implementation, one or more of the organization computing devices 120 and/or client computing devices 140A-140Z may communicate directly with each other. For example, the client computing device 140A may include a Bluetooth device that sends/receives data to/from the organization computing device 120.

The described implementations of the disclosure allow transportation services organizations to implement engagement-based routing and loyalty programs for geographic routing entities (e.g., drivers and/or other employees of the organizations).

The engagement scorer 112 may generate an engagement score for a geographic routing entity of a geographic routing system (e.g., a driver providing transportation services for an organization (e.g., via a car service)). The engagement score may be a numerical representation based on a determined scale. For example, FIG. 3 may displays three first indicators 302 (marked) and seven second indicators 304 (unmarked), representing an engagement score of 30 out of 100. The engagement score from the engagement scorer 112 may be used to assign priority to a geographic routing entity during a route determination process implemented by the engagement-based route determiner 114 in the geographic routing system. In some implementations, the engagement score assigned to a geographic routing entity varies through the day according to the actions (e.g., interactions) of the geographic routing entity (e.g., transportation vehicle and/or driver of the transportation vehicle) with the geographic routing system. An engagement score may be based on parameters measuring engagement (e.g., engagement based on the actions of the geographic routing entity) of a corresponding geographic routing entity with the geographic routing system.

In one implementation, the engagement scorer 112 calculates an engagement score for each geographic routing entity providing transportation services for the geographic routing system. For purposes of the below discussion, a geographic routing entity may refer to a person that provides transportation (e.g., drives/provides rides) to one or more end users (e.g., corresponding to a client computing device 140) requesting transportation via the geographic routing system and/or may refer to the transportation vehicle itself. In addition, a client computing device 140 may correspond to a user that utilizes (e.g., requests, accepts or takes a ride) the geographic routing system. A user may also be referred to as an end user, a rider or a passenger.

For each geographic routing entity, the determination of the engagement score (e.g., by any variety of possible different calculations and/or formulas) may factor in one or more parameters. These parameters may include, but are not limited to, one or more of acceptances of requests by the identified geographic routing entity per day (e.g., the number of times the driver accepts of user ride offer), ignoring of requests by the identified geographic routing entity per day (e.g., a number of times the driver ignores an offer for a user ride), rejections of requests by the identified geographic routing entity per day (e.g., a number of times the driver rejects an offer for a user ride), available status of the identified geographic routing entity per day (e.g., a duration of time that the driver is available to accept user ride offers), busy status of the identified geographic routing entity per day (e.g., a duration of time that the driver is busy (e.g., performing other job-related actions)), offline status of the identified geographic routing entity per day (e.g., a duration of time that the driver is offline (e.g., signed off)) from the organizational servers, and/or an in-ride status of the identified geographic routing entity per day (e.g., duration of time that the driver is providing ride services to a user).

In some implementations, a current loyalty score of the driver, as determined by loyalty scorer 116, and discussed further below, is a parameter in the engagement score calculation for the driver. In some implementations, an average number of geographic routing entities who obtain a daily bonus is a parameter in the engagement score calculation for the geographic routing entity. In some implementations, correlation of cumulative cost of bonuses to overall rides revenue is a parameter in the engagement score calculation for the geographic routing entity. The parameters discussed above may be stored as driver data 134 in data store 130.

The weight of each parameter within the engagement score calculation can be a variable that can be changed through systems settings (e.g., via organization computing device 120). In one implementation, the engagement score can be reset. For example, the engagement score is reset (e.g., to a predetermined value) after a corresponding geographic entity has an offline status for a threshold amount of time (e.g., once the driver is offline for 5 hours or more, the engagement score is reset to 50 (5 bars out of 10)). The engagement score after the reset can be an adjustable system setting. In addition, the threshold amount of time or time of day to reset the engagement score can be an adjustable system setting. The engagement score for the drivers may be stored as score data 132 in data store 130.

In one implementation, the engagement score for geographic routing entities are used as a contributing factor for the route determination process. The engagement-based route determiner 114 may utilize engagement scores of geographic routing entities to give geographic routing entities that are engaged (e.g., engaged drivers) more offers for end user rides by factoring in the engagement score of the geographic routing entity (e.g., the driver's acceptance rate, etc.) together with the distance of the geographic routing entity from the client computing device corresponding to the request (e.g., the requesting user) within a sorting process. Furthermore, the engagement-based route determiner 114 may utilize engagement scores of geographic routing entities to give a geographic routing entity that is engaged an advantage in obtaining an offer for an end user ride after the geographic routing entity has accepted the offer (e.g., selecting the chosen geographic routing entity based on the corresponding engagement score and the corresponding distance from the client computing device). For example, if two or more geographic routing entities accept the request for a geographic routing entity from the client computing device (e.g., an offer from a user), the geographic routing entity with the best combined score (i.e., engagement score+distance) is selected as the chosen geographic routing entity (e.g., wins the ride offer).

The impact of the engagement score on the routing can be controlled through a system setting. For example, the engagement-based route determiner 114 may be configured to use the engagement score before transmitting the request to geographic routing entities (e.g., an offer is provided to a driver), after receiving an acceptance from a geographic routing entity (e.g., an offer is accepted by a driver), or at some combination of the two. In some implementations, the settings of the engagement-based route determiner 114 may be configured per geographic region and/or per-transportation category (e.g., black car, priority, business, etc.).

In one implementation, the engagement-based route determiner 114 may utilize an engagement score calculated by engagement scorer 112 according to the formula below:

$$\alpha * \left(1 - \frac{\text{Driver Distance (m)}}{\text{Max distance (radius per setting)}}\right) +$$
$$(1 - \alpha) * \frac{\text{Driver engagement rate}}{\text{Max (driver engagement rate)} - \text{Min (driver engagement rate)}}$$

Parameter $\alpha$ (in %) should be a system setting that can adjust the balance between the engagement rate and the distance. Any decrease of $\alpha$ should increase the average air distance between client computing device and geographic routing entity (e.g., rider and driver) and increase the number of cases where a geographic routing entity is favored due to a higher engagement rate (e.g., engagement score) of the geographic routing entity. Driver distance is the distance between a geographical routing entity and the client computing device 140. Max distance is a radius from the client computing device 140 (e.g., 10 km) which may be set in the system settings. The driver engagement rate is the engagement rate of the geographic routing entity as determined by the engagement scorer 112 of transportation server 110. The Min/max engagement rates may be calculated per request for the geographic routing system from a client computing device (e.g., order). For example, the transportation server 110 may identify a subset of geographic routing entities that are within a determined distance (e.g., user setting radius) of the client computing device and the maximum driver engagement rate (e.g., highest engagement score, average of the 75$^{th}$ percentile of engagement scores, highest engagement score taking out outliers, etc.) may be determined from the engagement scores of the identified subset and the minimum driver engagement rate (e.g., lowest engagement score, average of the 25$^{th}$ percentile of engagement scores, lowest engagement score taking out outliers, etc.) may be determined from the engagement scores of the identified subset.

In one implementation, requests for the geographic routing system from client computing devices (e.g., offers to drive an end user passenger) are sent to those geographic routing entities that have a high engagement score (e.g., above a threshold score value). In another implementation, requests for the geographic routing system from client computing devices (e.g., offers to drive an end user passenger) are sent to all geographic routing entities in a determined vicinity of the client computing device (e.g., end user passenger), but are then sorted according to the engagement score of the geographic routing entity. In another implementation, requests for the geographic routing system from client computing devices (e.g., offers to drive an end user passenger) are sent to all geographic routing entities in a determined vicinity of the client computing device (e.g., end user passenger). Based on the geographic routing entities that transmit a response (e.g., acceptance, etc.) in response to the request (e.g., accepted an offer), a selection is made according to the engagement score of the accepting geographic routing entities. Implementations of the disclosure can provide support for at least all of the above options and some combination of the above based on geographic region, for example.

Figure 3:
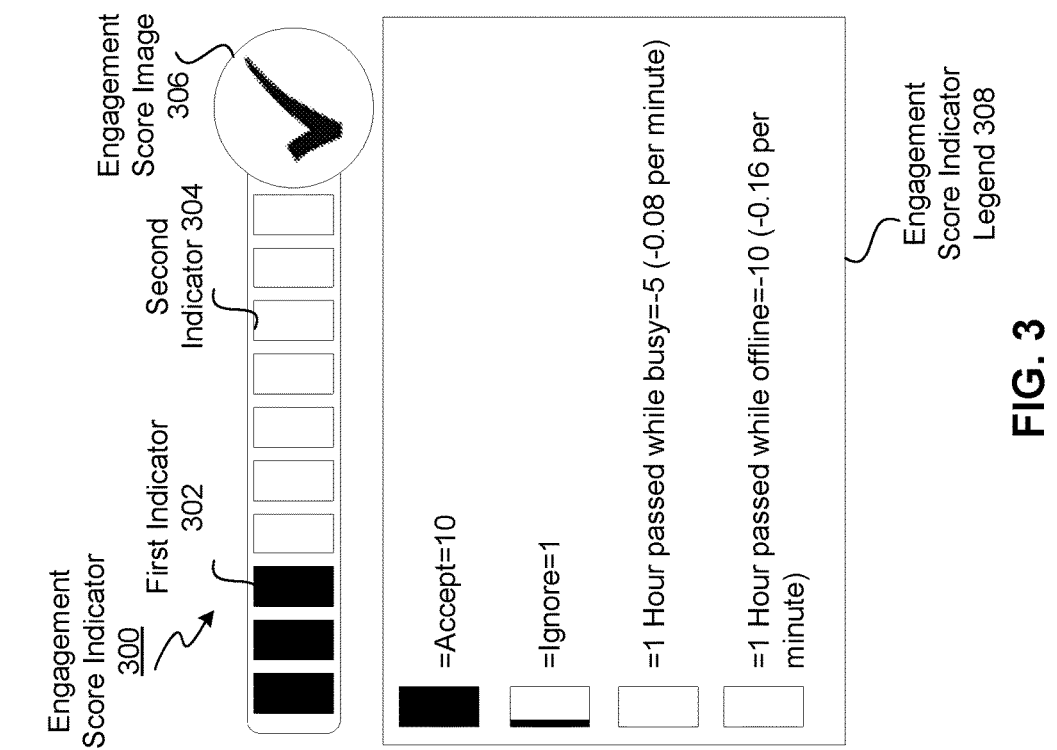
FIG. 3 is a diagram of an engagement score indicator, in accordance with an implementation of the disclosure.
Figure 2A:
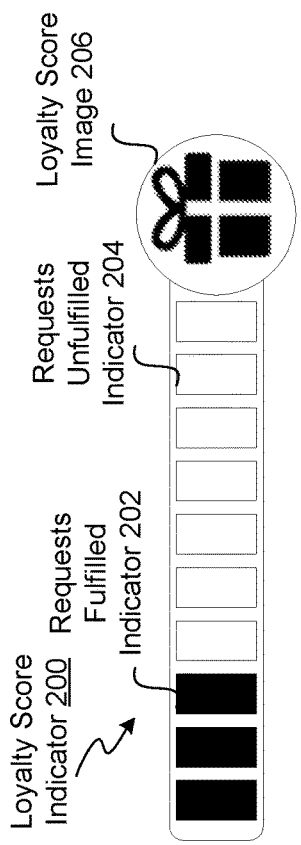
FIG. 2A is a diagram of a loyalty score indicator over a first interval of time, in accordance with an implementation of the disclosure.
Figure 2B:
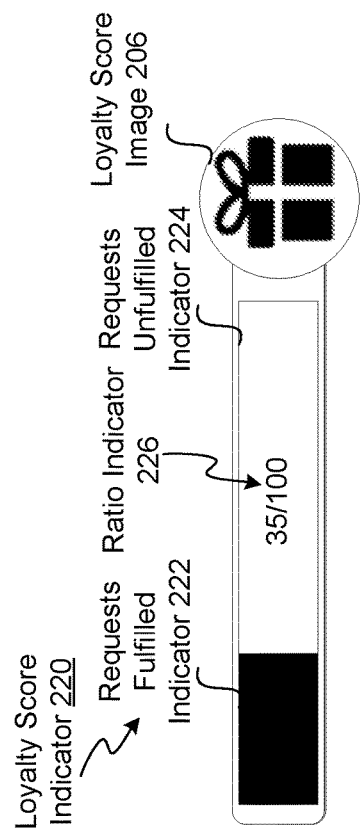
FIG. 2B is a diagram of a loyalty score indicator over a second period of time, in accordance with an implementation of the disclosure.
Figure 2C:
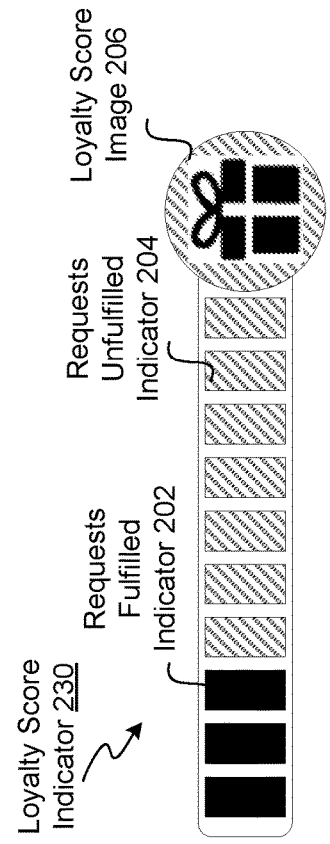
FIG. 2C is a diagram of a loyalty score indicator during a bonus mode, in accordance with an implementation of the disclosure.

In some implementations, the engagement score and the loyalty score are displayed to geographic routing entities via a driver user interface 152A-152Z (e.g., graphical user interface (GUI)) at the vehicle computing device 150A-Z. FIGS. 2A-2C illustrate diagrams for a loyalty score indicator that can be displayed on a GUI window and FIG. 3 illustrates a diagram for an engagement indicator that can be displayed on a GUI window.

FIG. 2A is a diagram of a loyalty score indicator 200 over a first interval of time (e.g., one day, etc.), in accordance with an implementation of the disclosure. Loyalty scorer 116 of the transportation server 110 may generate a loyalty score to display via a loyalty score indicator 200 on the driver user interface 152A to the geographic routing entity. The loyalty score indicator 200 may include one or more of a requests fulfilled indicator 202, a requests unfulfilled indicator 204, and a loyalty score image 206. The loyalty score indicator 200 may provide a visual representation of the loyalty score via the requests fulfilled indicator 202 and requests unfulfilled indicator 204. In one implementation, the loyalty score indicator 200 provides the loyalty score over a first interval of time is indicated as a collection of shapes (e.g., ten rectangles, ten boxes, etc.), with requests fulfilled indicator 202 being shapes that are marked (e.g., filled-in black, filled-in with a first color or pattern, reflecting the loyalty score, etc.) and the requests unfulfilled indicator 204 being shapes that are not marked.

The total number of shapes may be a threshold amount over the first interval of time (e.g., minimum daily rides that must be given to obtain the daily bonus). For example, the loyalty score indicator 200 may display three boxes filled-in black and seven boxes not filled-in black. Therefore, the loyalty score would be three out of ten (e.g., ten being the total number of requests that must be fulfilled to receive the daily bonus). Other implementations of displaying a loyalty score by the loyalty score indicator 200 are also possible, and may include, but are not limited to, providing a number corresponding to the loyalty score, providing an indication of the loyalty score on a sliding bar indicator, and so on.

Figure 4A:
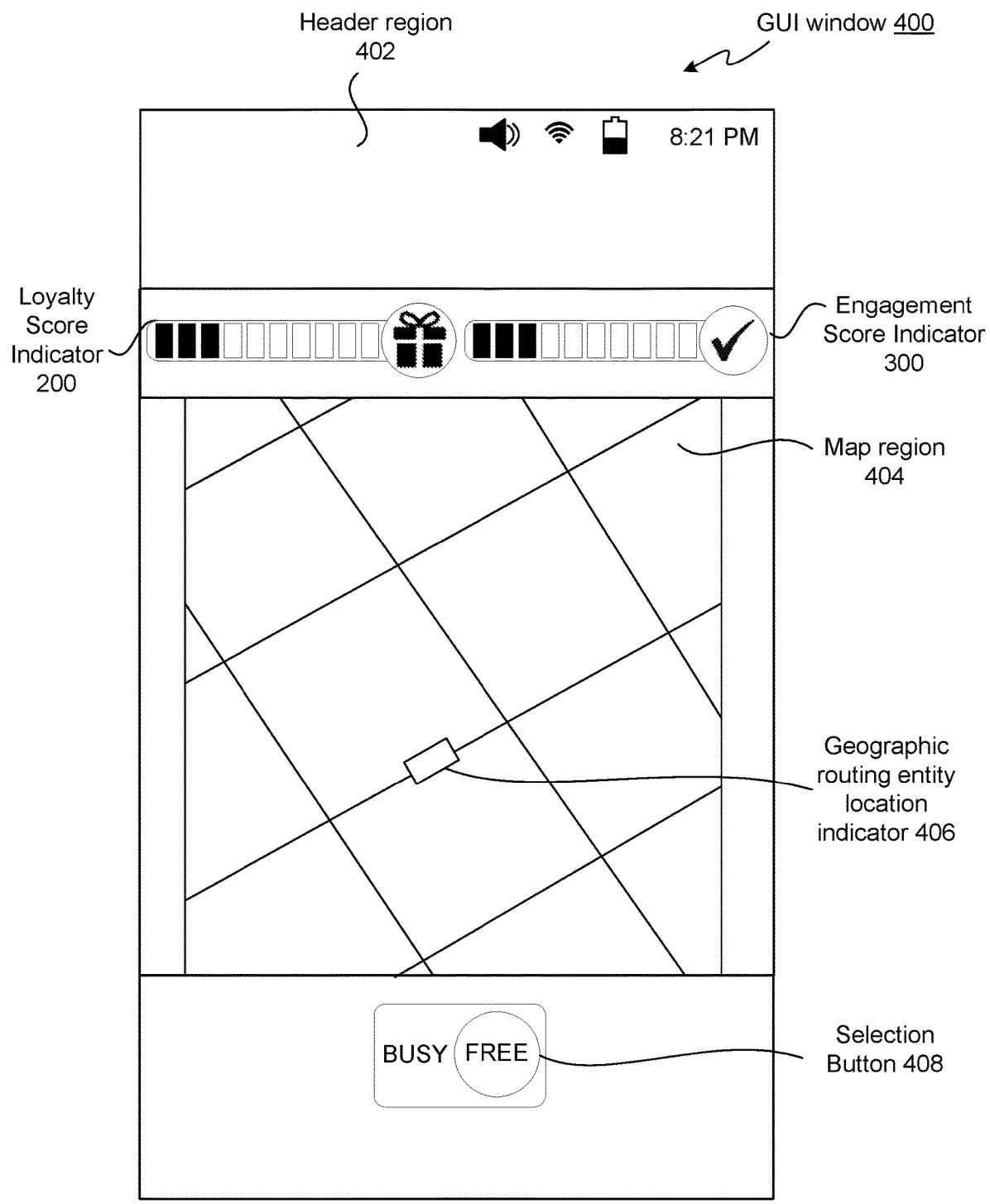
FIGS. 4A-C illustrates example GUIs for a geographic routing entity that provide a visual indication of changing an engagement score corresponding to the geographic routing entity, in accordance with an implementation of the disclosure.
Figure 5A:
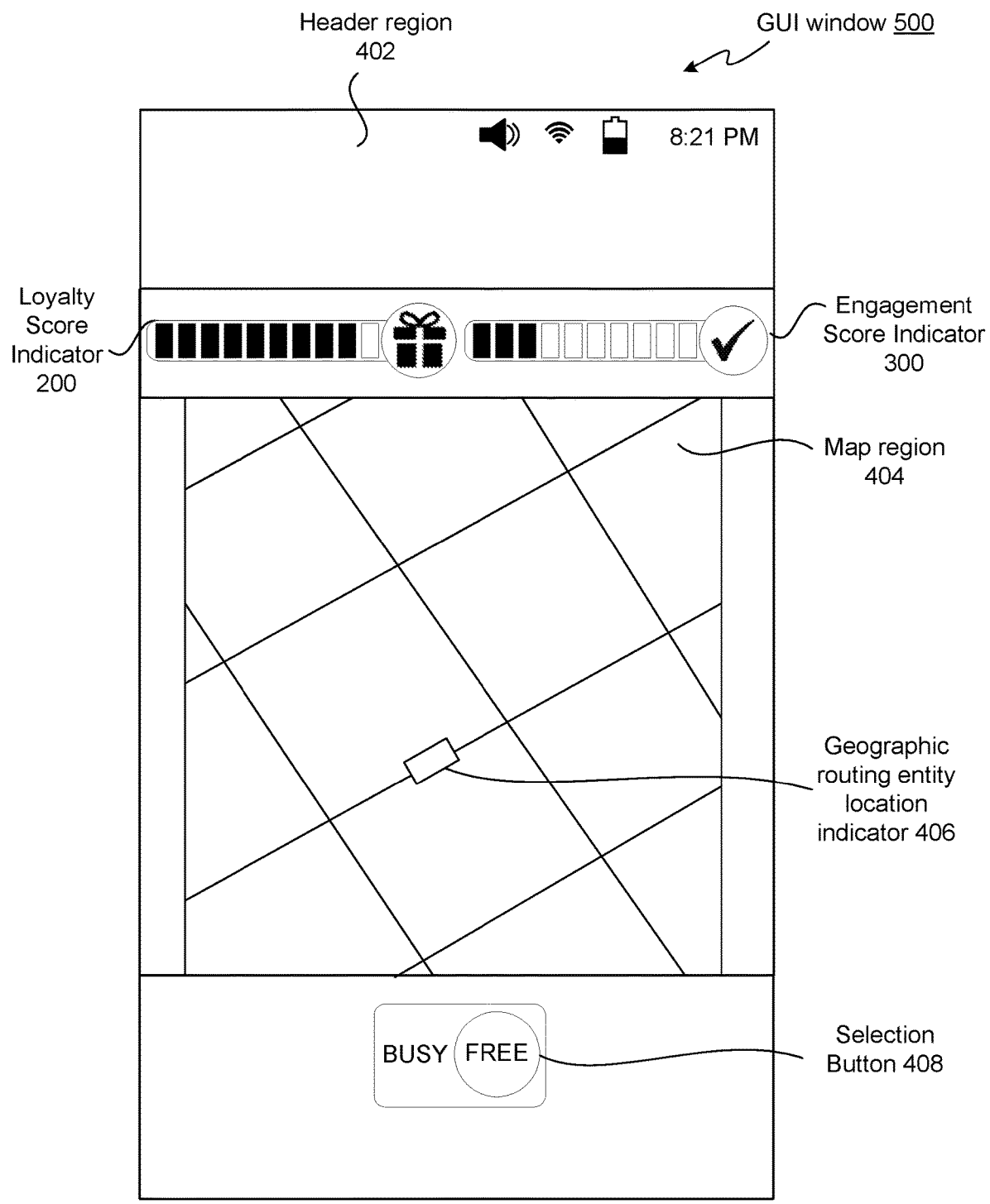
FIGS. 5A-F illustrates example GUIs for a geographic routing entity that provide a visual indication of changing a loyalty score corresponding to the geographic routing entity, in accordance with an implementation of the disclosure.
Figure 5B:
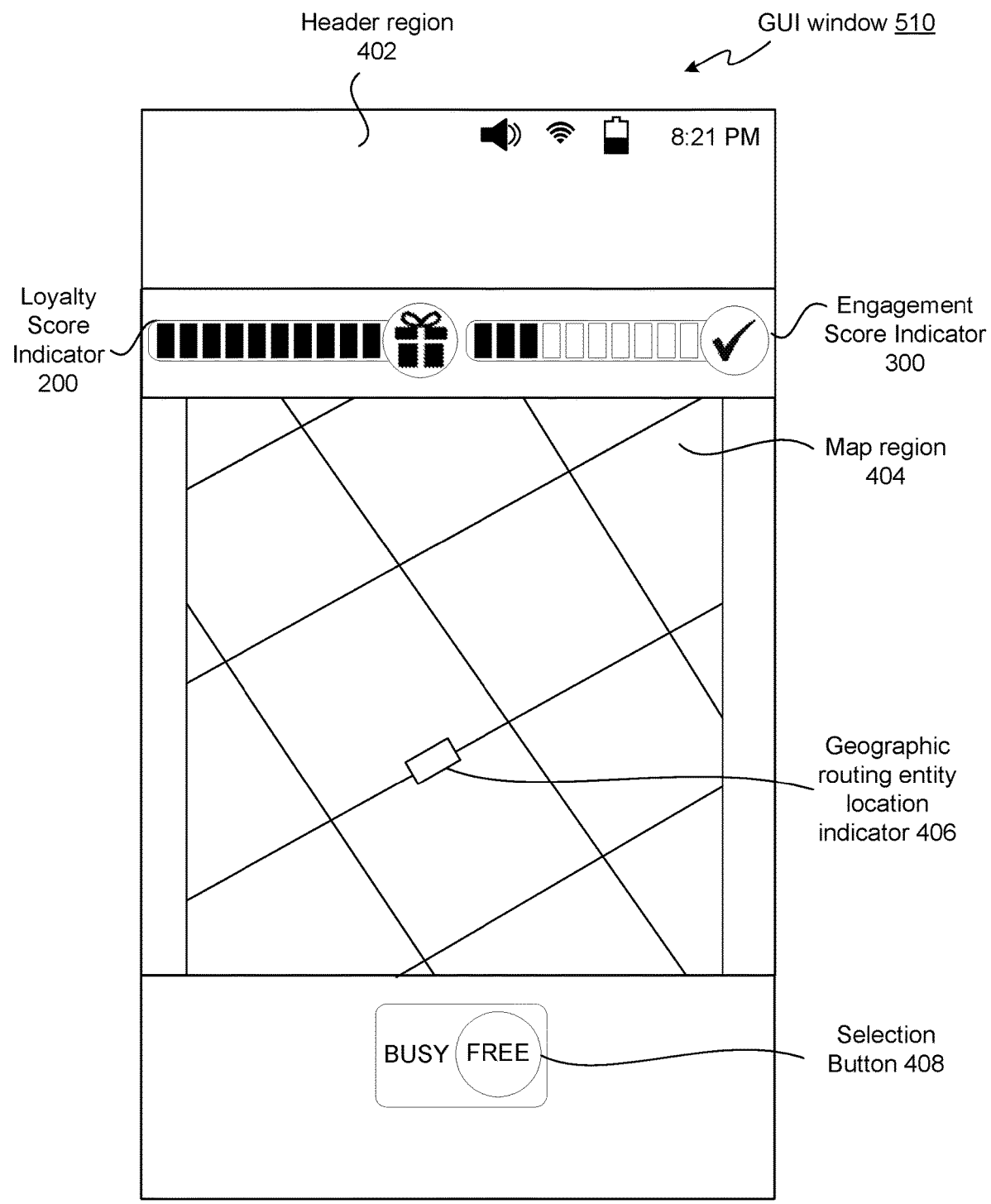

In one implementation, when a geographic routing entity fulfills a request (e.g., completes a ride), the loyalty score of the geographic routing entity may increase, which is reflected as an increase in black boxes shown from FIGS. 5A-B. In some implementations, an audio indication may also be played to the geographic routing entity when the loyalty score of the geographic routing entity increases. The loyalty score indicator 200 (e.g., loyalty score progress bar) may be displayed to drivers in a "free" screen or in a "busy" screen (see FIG. 4A). While the geographic routing entity is fulfilling a request (e.g., during a ride), the loyalty score indicator 200 may not be displayed.

The loyalty score indicator 200 (e.g., loyalty score gauge) may be the same as the loyalty score indicator 200 shown in FIGS. 4A-5C and 6A. When the geographic routing entity fulfills a request, the loyalty score of the geographic routing entity may increase (e.g., by a value of 1, by one shape, by one box, etc.), which is reflected as a single black box in the loyalty score indicator 200. The loyalty score indicator 200 may be reset (e.g., all boxes may become unfilled) at the end of a first interval of time (e.g., each day, at midnight). Once all boxes in the loyalty score indicator 200 become filled within a first interval of time, loyalty score indicator 220 of FIG. 2B may be displayed.

FIG. 2B is a diagram of a loyalty score indicator 220 over a second period of time, in accordance with an implementation of the disclosure. After all boxes in the loyalty score indicator 200 become filled within a first interval of time (e.g., fulfill ten requests in one day, give ten rides in one day, etc.), loyalty score indicator 220 may be displayed. Loyalty scorer 116 of the transportation server 110 may generate a loyalty score to display via a loyalty score indicator 220 on the driver user interface 152A to the geographic routing entity in response to the first count over the first interval of time (e.g., the loyalty score indicator 200 of FIG. 2A) meeting a first threshold value (e.g., all of the shapes in the loyalty score indicator 200 becoming filled, giving ten rides during the first interval of time). The loyalty score indicator 220 may include one or more of requests fulfilled indicator 202, a requests unfulfilled indicator 204, and a loyalty score image 206.

The loyalty score indicator 220 may provide a visual representation of the loyalty score over the second interval of time (e.g., monthly) via the requests fulfilled indicator 222, requests unfulfilled indicator 224, and ratio indicator 226. In one implementation, the loyalty score indicator 220 provides the loyalty score over a second interval of time as an indication of the loyalty score on a sliding bar indicator (e.g., 35% of the bar is filled-in (e.g., requests fulfilled indicator 222) and 65% is unfilled (requests unfulfilled indicator 224)) and displaying a loyalty score (e.g., 35/100 (ratio indicator 226)) via the loyalty score indicator 220. Other implementations of displaying a loyalty score over the second interval of time by the loyalty score indicator 220 are also possible, and may include, but are not limited to a collection of shapes (e.g., rectangles, boxes, etc.), with the shapes that are marked (e.g., filled-in black) reflecting the loyalty score over the second interval of time.

Figure 5C:
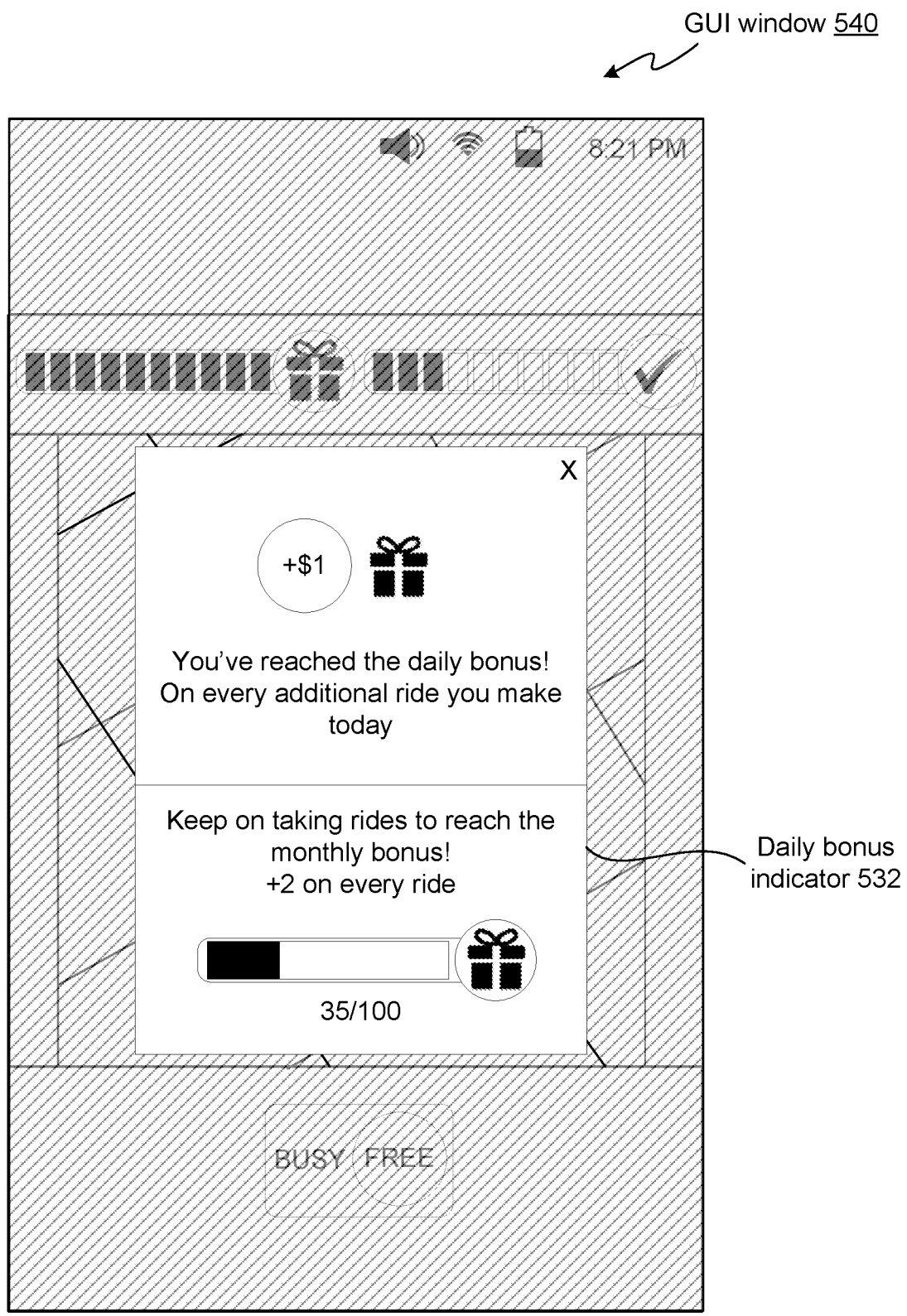
Figure 5D:
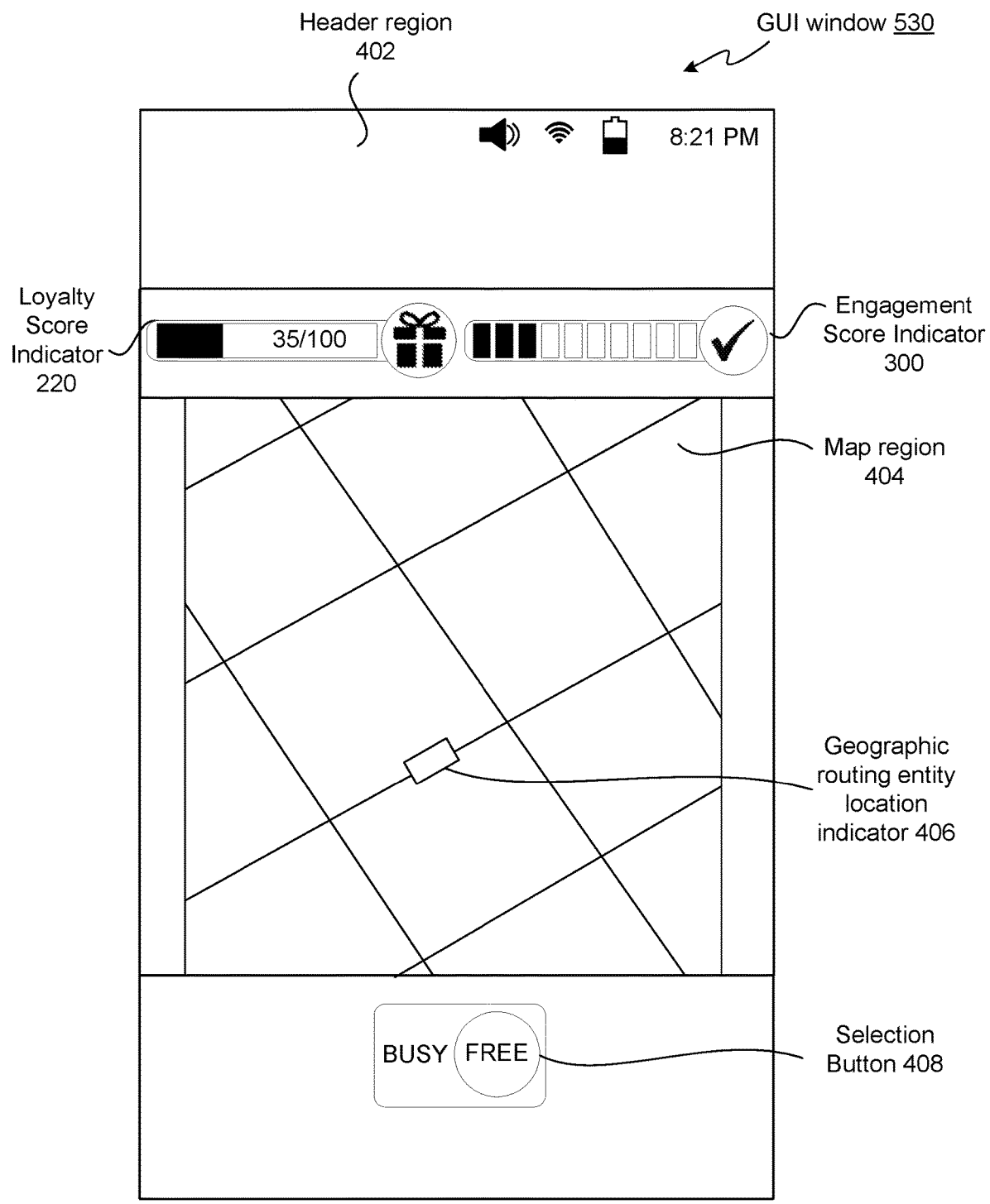
Figure 5E:
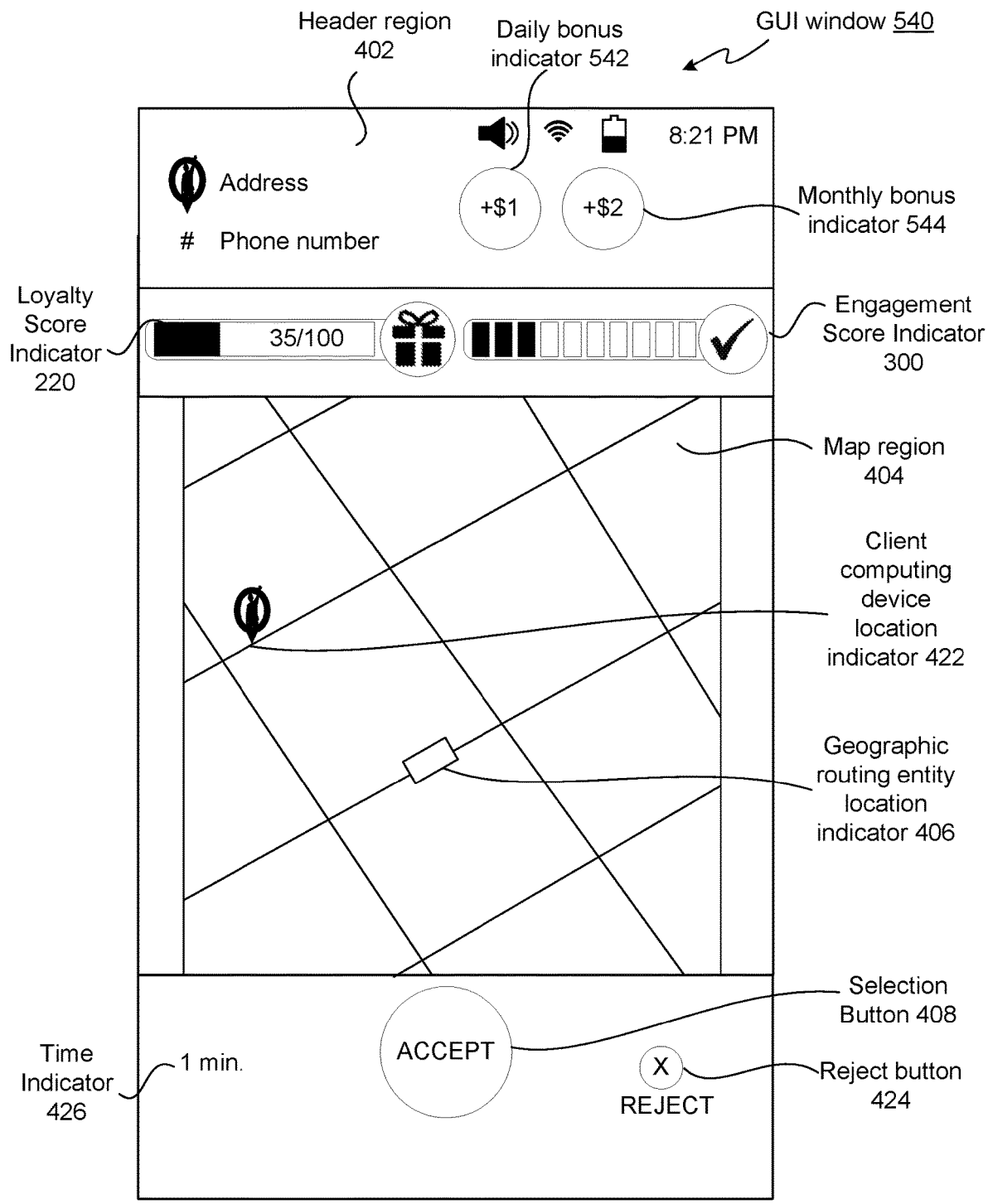

The loyalty score indicator 220 (e.g., loyalty score gauge) may be the same as the loyalty score indicator 220 shown in FIGS. 5D-E. When the geographic routing entity fulfills a request, the loyalty score of the geographic routing entity may increase (e.g., by a value of 1, by one shape, by one box, etc.), which is reflected as the requests fulfilled indicator 222 and the ratio indicator 226 in the loyalty score indicator 220. The loyalty score indicator 220 may be reset (e.g., not display requests fulfilled indicator 222, display 0/100 in ratio indicator 226) at the end of a second interval of time (e.g., end of the month, one month after the geographic routing entity last had a second count that met the second threshold, end of the month after the month when the second threshold was met).

FIG. 2C is a diagram of a loyalty score indicator 230 during a bonus mode, in accordance with an implementation of the disclosure. A bonus mode may correspond to a period of time and a geographic region. During the period of time corresponding to bonus mode, all geographic routing entities within the geographic region earn a loyalty bonus for each request fulfilled during the bonus mode. The period of time and the geographic region may correspond to a time and geographic region when supply of geographic routing entities is low, demand for geographic routing entities is high, and/or a ratio of demand to supply is high.

The transportation server 110 may transmit an indication to the vehicle computing device 150 to enter the bonus mode in response to the transportation server 110 determining that the demand for geographic routing entities exceeds a first threshold value, the supply of geographic routing entities is below a second threshold value, or a ratio of demand to supply exceeds a third threshold value. During the bonus mode, one or more of the requests unfulfilled indicators 204 or the loyalty score image 206 of the loyalty score indicator 230 may indicate via the vehicle user device 152 that the geographic routing system is currently in bonus mode for the geographic region where the corresponding geographic routing entity is located. The requests unfulfilled indicator 204 and/or loyalty score image 206 may become shaded or have a different color during the bonus mode. During the bonus mode, a geographic routing entity may earn monthly bonus as described with respect to FIGS. 6A-B. Loyalty score indicator 230 may be the same as loyalty score indicator 230 of FIG. 6B.

FIG. 3 is a diagram of an engagement score indicator 300, in accordance with an implementation of the disclosure. Engagement scorer 112 of the transportation server 110 may generate an engagement score to display via the engagement score indicator 300 displayed on the driver user interface 152A to the geographic routing entity. The engagement score indicator 300 may include one or more of a first indicator 302, a second indicator 304, or engagement score image 306.

In one implementation, the engagement score indicator 300 provides the engagement score as a collection of shapes (e.g., ten rectangles, ten boxes, etc.), with first indicator 302 being shapes that are marked (e.g., filled-in black, reflecting the engagement score) and the second indicator 304 being shapes that are not marked. The total number of shapes may be a threshold amount. For example, the engagement score indicator 300 may display three boxes filled-in black and seven boxes not filled-in black, therefore, the engagement score would be three out of ten. Other implementations of displaying a engagement score by the engagement score indicator 300 are also possible, and may include, but are not limited to, providing a number corresponding to the engagement score, providing an indication of the engagement score on a sliding bar indicator, and so on.

The engagement score indicator 300 (e.g., engagement score gauge) may be the same as the engagement score indicator 300 shown in FIGS. 4A-6B. The engagement score indicator in FIG. 3 may include an engagement score indicator legend 308 that depicts how actions of a geographic routing entity may affect the engagement score of the geographic routing entity. For example, when the geographic routing entity accepts a request, the engagement score of the geographic routing entity may increase by a value of 10, which is reflect as a single black box (e.g., first indicator 302, a second indicator 304 may become a first indicator 302, an unmarked shape may become marked) in the engagement score indicator 300. Conversely, if the driver ignores a request, the engagement score of the geographic routing entity may decrease by a value of 1, which is reflected in the engagement score indicator 300 by decreasing one of the black boxes (e.g., first indicator 302) in the engagement score indicator 300 with a portion of a different color (e.g., not-filled, white, light-gray color, a second pattern or a second color, etc.). The engagement score of the geographic routing entity may decrease while the geographic routing entity is busy (e.g., a rate of −0.08 per minute (e.g., a value of 5 for one hour busy)) or while the geographic routing entity is offline (e.g., a rate of −0.16 per minute (e.g., a value of 10 for one hour offline)).

Figure 4B:
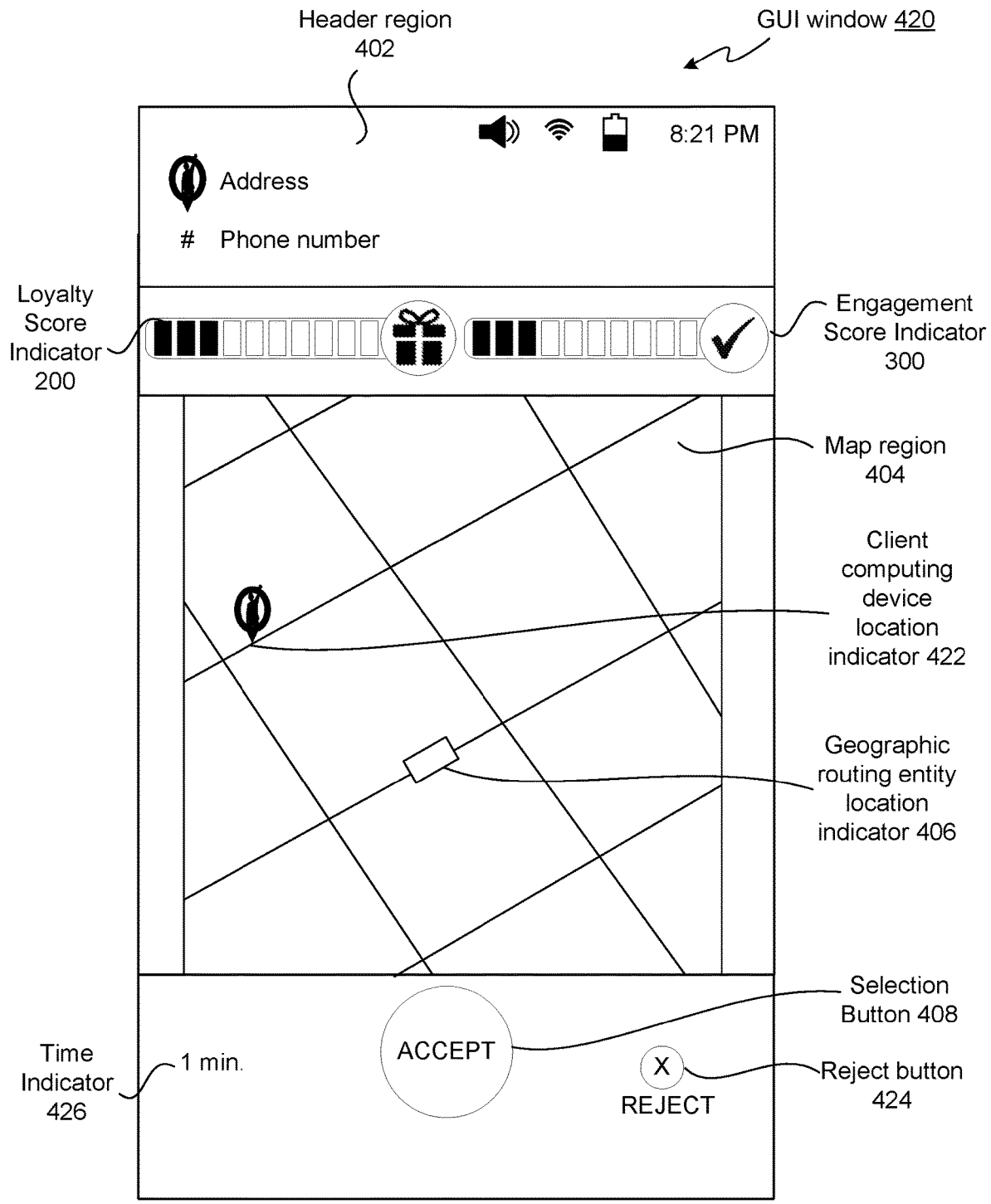
Figure 4C:
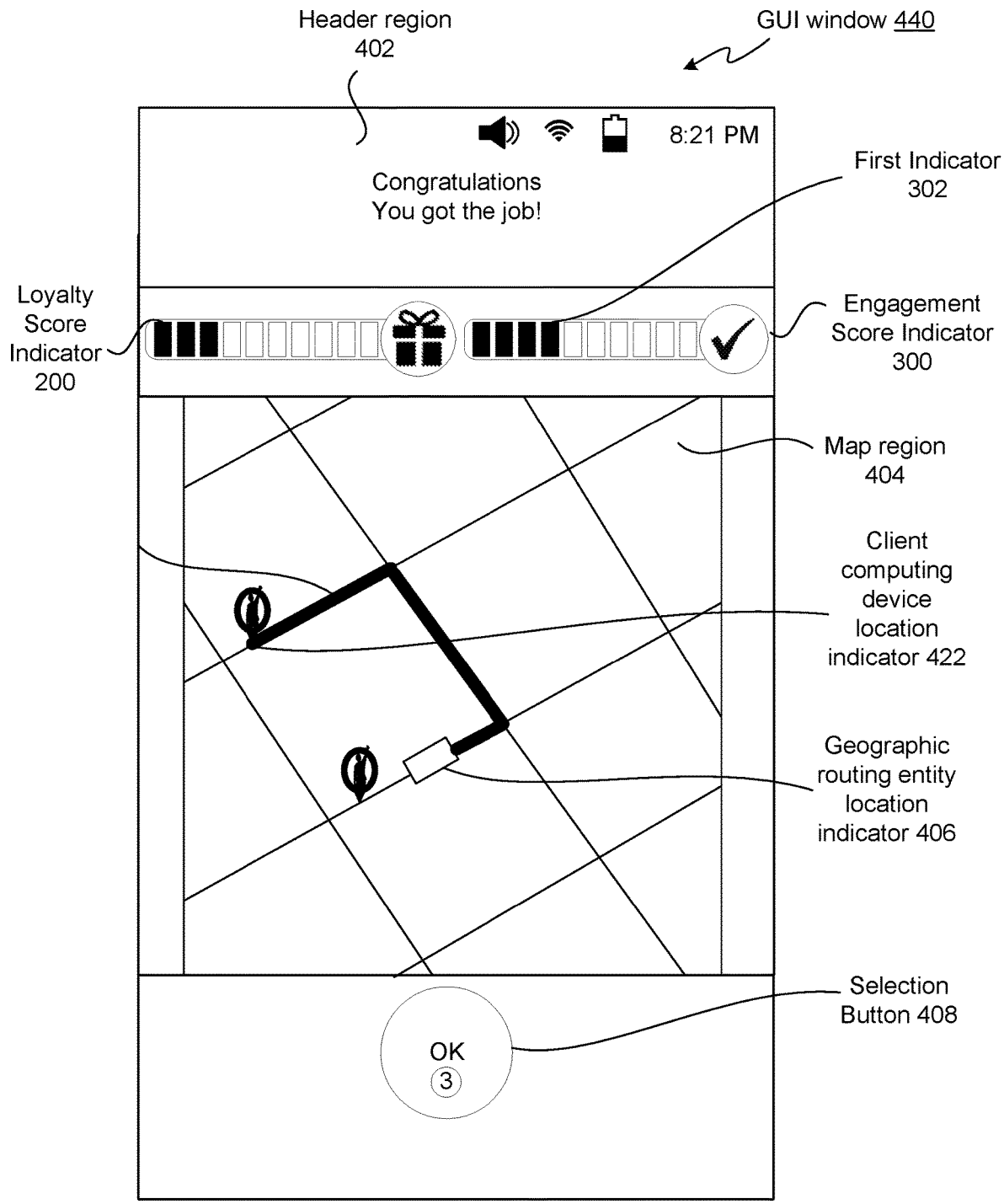

FIGS. 4A-C illustrate example GUIs for a geographic routing entity that provides a visual indication of changing an engagement score corresponding to the geographic routing entity, in accordance with an implementation of the disclosure. FIGS. 4A-C may illustrate GUIs that indicate to a geographic routing entity (e.g., transportation services driver) an engagement score corresponding to the geographic routing entity, and depicting how the visual indication of the engagement score of the geographic routing entity changes when the geographic routing entity accepts a request.

FIG. 4A illustrates an example GUI window 400 (e.g., of a transportation application) for a geographic routing entity that provides a visual indication of an engagement score and a loyalty status corresponding to the geographic routing entity, in accordance with an implementation of the disclosure. In some implementations, the GUI window 400 and similar GUI windows described herein are implemented by a user interface of the geographic routing system (e.g., driver user interface 152A) of a vehicle computing device (e.g., vehicle computing device 150A) as an executed transportation application. GUI window 400 may be presented for display by the vehicle computing device 150A (e.g., a transportation application executed by the vehicle computing device 150A).

The GUI window 400 includes one or more of a header region 402, a loyalty score indicator 200 (see FIG. 2A), an engagement score indicator 300 (see FIG. 3), a map region 404, a geographic routing entity location indicator 406, or a selection button 408.

Header region 402 may include a drop-down menu that includes one or more options. In some implementations, if the GUI window 400 is implemented on a client computing device, such as a mobile device, device information (e.g., volume, internet connection, battery capacity, current time) may be included in header region 402. In other implementations, such as if the GUI window 400 is implemented on a different device (a device other than a mobile device), the device information may be omitted or may be different.

Loyalty score indicator 200 may display a current loyalty score for the geographic routing entity (see FIG. 2A) and the engagement score indicator 300 may display a current engagement score for the geographic routing entity (see FIG. 3).

The map region 404 may display the current location of the geographic routing entity via the geographic routing entity location indicator 406.

The selection button 408 may allow the geographic routing entity (e.g., the driver) to make a selection corresponding to the information on the GUI window 400 and the information displayed in the selection button 408. In the GUI window 400, the selection button 408 displays "busy" and "free" with a selector the geographic routing entity may move to select "busy" or "free" (e.g., "free" is selected by moving the circle to surround "free"). A selection via the selection button 408 of "free" may indicate that the geographic routing entity is available to accept requests (e.g., give rides). A selection via the selection button 408 of "busy" may indicate that the geographic routing entity is not available to accept requests.

The engagement score may be displayed via engagement score indicator 300 to the geographic routing entity within, for example, GUI window 400 when "free" is selected by the selection button 408 ("free" screen), GUI window 400 when "busy" is selected by the selection button 408 ("busy" screen) and in the incoming offer screen. The geographic routing entity can view the engagement score of the geographic routing entity within the engagement score indicator 300, which changes according to the ongoing actions and behaviors of the geographic routing entity. In one implementation, when the geographic routing entity selects "accept" via the selection button 408 (see FIG. 4B), the engagement score displayed via the engagement score indicator 300 on the GUI window 400 may immediately increase. Conversely, in one implementation, when the geographic routing entity goes "busy," the geographic routing entity can immediately see the engagement score go down. GUI window 400 depicts a geographic routing entity in a "free" state with an engagement score of 3 out of 10 boxes in the engagement score indicator 300 at the top right corner of the GUI window 400.

FIG. 4B illustrates an example GUI window 420 (e.g., of a transportation application) for a geographic routing entity that provides a visual indication of a request transmitted to a geographic routing entity, in accordance with an implementation of the disclosure. The GUI window 420 includes one or more of a header region 402, a loyalty score indicator 200 (see FIG. 2A), an engagement score indicator 300 (see FIG. 3), a map region 404, a geographic routing entity location indicator 406, a selection button 408, client computing device location indicator 422, reject button 424, or time indicator 426.

Header region 402 may include an address and phone number corresponding to the client computing device 140 from which the request was received. The address may be one or more of the geographic location of the client computing device 140, the pick-up location, a location proximate to the client computing device 140, etc.

In GUI window 420, the selection button 408 may display "accept." A geographic routing entity may accept the request by selecting selection button 408 in GUI window 420. Upon selecting the selection button 408 of "accept," the engagement score displayed by the engagement score indicator 300 may increase (e.g., increase by 10 or one first indicator 302) (see FIG. 4C). The GUI window 420 may also display a reject button 424. A geographic routing entity may reject the request by selecting the reject button 424. Upon selecting the reject button 424, the engagement score displayed by the engagement score indicator 300 may decrease or stay the same.

The map region 404 may display the geographic routing entity location indicator 406 and the client computing device location indicator 422 (e.g., pick-up location, location of the client computing device 140, etc.). The address in header region 402 may correspond to the client computing device location indicator 422.

The time indicator 426 may display the amount of time (e.g., 1 min) it may take for the geographic routing entity to arrive at the location of the client computing device 140.

FIG. 4C illustrates an example GUI window 440 (e.g., of a transportation application) for a geographic routing entity that provides a visual indication of selecting the geographic routing entity to fulfill the request, in accordance with an implementation of the disclosure. GUI window 440 may depict a result of the geographic routing entity selecting the selection button displayed in GUI window 420 (e.g., the accept button). The GUI window 440 includes one or more of a header region 402, a loyalty score indicator 200 (see FIG. 2A), an engagement score indicator 300 (see FIG. 3), a map region 404, a geographic routing entity location indicator 406, a selection button 408, client computing device location indicator 422, or route 442.

The header region 402 may include an indication that the geographic routing entity was selected (e.g., "congratulations, you go the job"). The engagement score indicator 300 may show the engagement score of the geographic routing entity has increased to four out of ten boxes as a result of the geographic routing entity accepting the request. In some implementations, even if the geographic routing entity is not selected to fulfill the request, the engagement score of the geographic routing entity still increases when the geographic routing entity transmits an acceptance (e.g., selects the selection button 408 in GUI window 440). As discussed above, the engagement score of the geographic routing entity may be a contributing factor as to whether the geographic routing entity is selected to fulfil a request (e.g., receives an accepted offer as a job).

The map region may display a route 442 from the geographic routing entity location indicator 406 to the client computing device location indicator 422.

The selection button 408 may display "OK" and may display a number ("3"). Upon selection by the geographic routing entity of the selection button 408 in GUI window 440, the GUI window 440 may display routing instructions of how to arrive at the location corresponding to the client computing device location indicator 422. A number displayed by selection button 408 may be a quantity of time (e.g., three seconds) that the selection button 408 will be available before the GUI window 440 displays routing instructions of how to arrive at the location corresponding to the client computing device location indicator 422.

In some implementations, a loyalty program may be provided to encourage geographic routing entities to accept more requests (e.g., over a first interval of time (daily) and over a second interval of time (monthly). The loyalty program rewards the geographic routing entity for performing a determined number of rides per interval of time (e.g., per day, per month). In one implementation, the loyalty scorer 116 generates a loyalty score for each driver in the system 100. The loyalty scorer 116 may provide each driver 1 loyalty credit per each ride provided by the driver (see FIG. 2A). The number of rides performed in order to receive a loyalty bonus can be a system setting, which is adjustable per region and/or transportation category. The loyalty bonus can also be disabled or enabled per region and/or transportation category via system settings. In some implementations, a system administrator can change the daily loyalty balance of a geographic routing entity in case, as well as view the daily bonus status per geographic routing entity in a listing of geographic routing entities (e.g., the driver page). The types of fulfilled requests (e.g., rides) that are counted by loyalty scorer 116 can be a system setting. For example, all rides=1, only credit card rides=2, short rides (less than a threshold distance)=3, and future rides=4.

When the driver has reached the daily target (see FIG. 2B), the loyalty scorer 116 causes the geographic routing entity to earn the daily loyalty bonus for the last ride and for any additional rides that day. A day may refer to a calendar day according to the time zone (00:01-24:00) of the geographic routing entity. The type of bonus can be controlled by the loyalty scorer 116 via a system setting and/or controlled per region for all transportation categories. For example, 1=+extra fee per every additional ride, 2=+extra % of every additional ride, 3=a one off fixed sum per that day, and so on. The value of the reward can be controlled by the loyalty scorer 116 via system setting and determine per region for the entire transportation category.

FIGS. 5A-F illustrate example GUIs for a geographic routing entity that provides a visual indication of changing of a loyalty score corresponding to the geographic routing entity, in accordance with an implementation of the disclosure. FIGS. 5A-F are a collection of GUIs depicting how actions of a geographic routing entity may affect the loyalty score of the geographic routing entity.

FIG. 5A illustrates an example GUI window 500 (e.g., of a transportation application) for a geographic routing entity that provides a visual indication of the loyalty score indicator 200 prior to attaining a first value meeting a first threshold over a first interval of time, in accordance with an implementation of the disclosure. FIG. 5A may be the same as FIG. 4A except that in FIG. 5A, the loyalty score indicator 200 has all requests fulfilled indicator 202 (e.g., filled-in boxes) except for one requests unfulfilled indicator 204 (see FIG. 2A).

FIG. 5B illustrates an example GUI window 510 (e.g., of a transportation application) for a geographic routing entity that provides a visual indication of the loyalty score indicator 200 after the first value meets the first threshold over the first interval of time, in accordance with an implementation of the disclosure. FIG. 5B may be the same as FIG. 4A and FIG. 5A except that in FIG. 5B, the loyalty score indicator 200 has all requests fulfilled indicator 202 (e.g., filled-in boxes) and no requests unfulfilled indicator 204 (see FIG. 2A).

For example, when the geographic routing entity fulfills a request (e.g., completes a ride), the loyalty score of the geographic routing entity may increase, which is reflected as one requests unfulfilled indictor 204 becomes a requests fulfilled indicator 202 (e.g., an increase in black boxes) shown from FIGS. 5A-B. In some implementations, an audio indication may also be played to the geographic routing entity when the loyalty score of the geographic routing entity increases. The loyalty score indicator 200 (e.g., loyalty score progress bar) may be displayed to geographic routing entity in the "free" screen or in the "busy" screen. During fulfilling a request (e.g., a ride, while the geographic routing entity is moving), the loyalty score indicator 200 may not be displayed.

FIG. 5C illustrates an example GUI window 520 (e.g., of a transportation application) for a geographic routing entity that provides a visual indication that the loyalty score displayed in the loyalty score indicator 200 has met the first threshold over the first interval of time, in accordance with an implementation of the disclosure. In GUI window 540, a daily bonus indicator 532 is displayed (e.g., when the driver has reached the daily loyalty score bonus target (i.e., x/x) a popup may be shown congratulating the driver on his or her achievement, and showing them the reward). The daily bonus indicator 532 may display one or more of the following: the geographic routing entity met the daily bonus (e.g., "you've reached the daily bonus"), information regarding the bonus (e.g., +$1 on every additional ride made today), information regarding a bonus over a second interval of time (e.g., "keep on taking rides to reach the monthly bonus! +2 on every ride," loyalty score indicator 220 (including requests fulfilled indicator 222, requests unfulfilled indicator 224, and ratio indicator 226)), etc. One or more portions of the GUI window 530 other than the daily bonus indicator 532 may be shaded or blurred.

FIG. 5D illustrates an example GUI window 530 (e.g., of a transportation application) for a geographic routing entity that provides a visual indication of a loyalty score indicator 220, in accordance with an implementation of the disclosure. After the first threshold over the first interval of time was met, the loyalty score indicator 220 is displayed which indicates how many requests must be fulfilled to meet the second threshold over the second interval of time (e.g., only 35 requests have been fulfilled out of the second threshold of 100 over the monthly interval of time). The loyalty score indicator 220 may depict the progress of the geographic routing entity toward a monthly bonus. The number of fulfilled requests (e.g., rides completed) versus the number of fulfilled requests required (e.g., rides required) to reach the second threshold over the second interval of time (e.g., monthly bonus) may be displayed to the geographic routing entity in the loyalty score indicator 220. In some implementations, the geographic routing entity may be shown the number of fulfilled requests versus the number of required fulfilled requests to reach the first threshold over the first interval of time (e.g., daily bonus) in the loyalty score indicator 220 as well.

FIG. 5E illustrates an example GUI window 540 (e.g., of a transportation application) for a geographic routing entity that provides a visual indication of a request transmitted to a geographic routing entity, in accordance with an implementation of the disclosure. GUI window 540 may be provided to a geographic routing entity when the geographic routing entity has reached the daily bonus. In the GUI window 540, one or more of a daily bonus indicator 542 or a monthly bonus indicator 544 may be displayed in the header region 402 with incoming requests alongside any other indications relating to the requests. The daily bonus indicator 542 may display a first bonus amount (e.g., +$1) and the monthly bonus indicator 544 may display a second bonus amount (e.g., +$2) that a geographic routing entity may receive if the geographic routing entity accepts the request, is selected, and fulfills 1 the request. The first bonus amount may be a daily bonus (e.g., +$1) in response to meeting a first threshold over a first threshold of time (e.g., having fulfilled ten requests that day) and the second bonus amount may be a monthly bonus (e.g., +$1) in response to meeting a second threshold over a second threshold of time (e.g., having fulfilled one hundred requests the previous month).

Figure 5F:
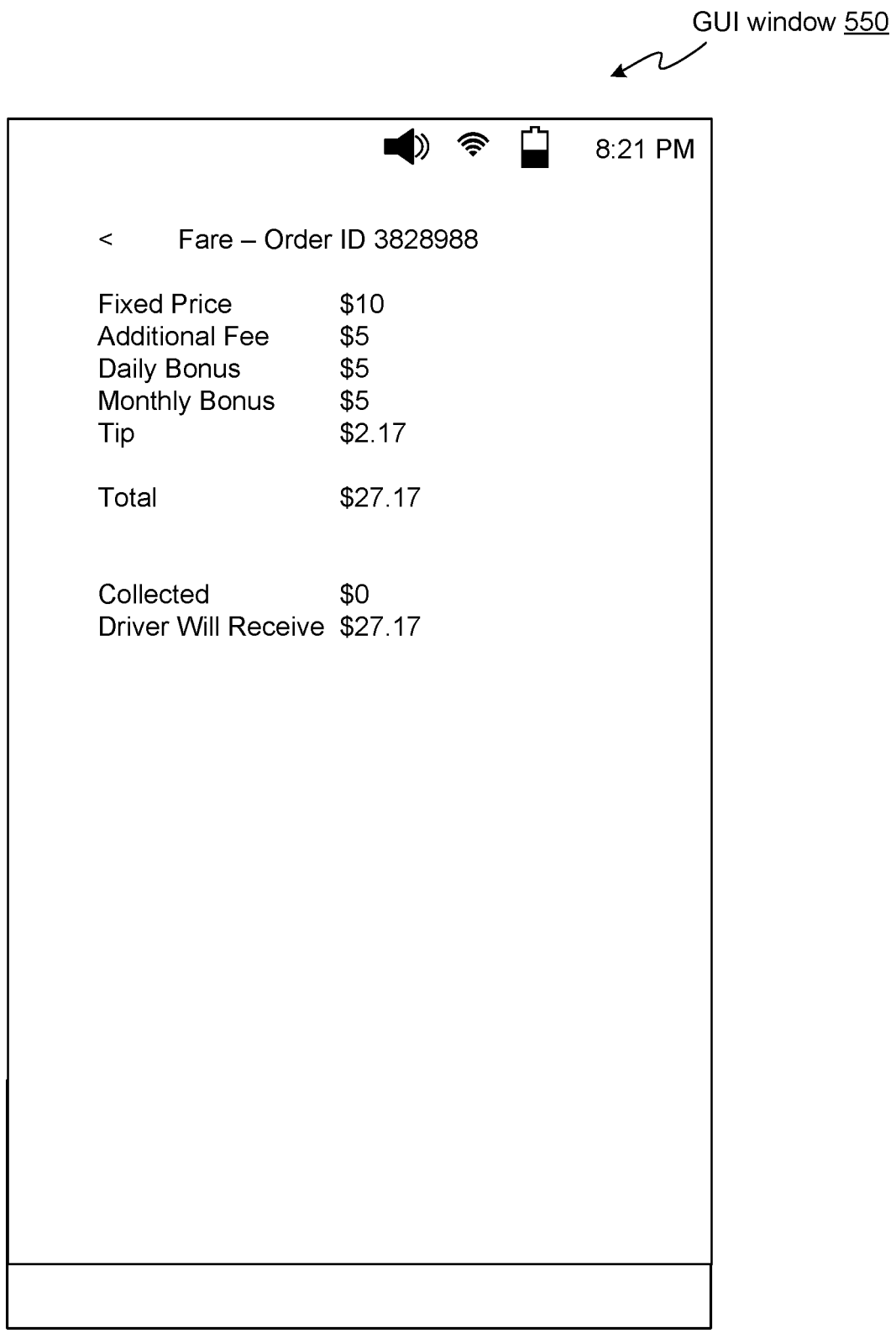

FIG. 5F illustrates an example GUI window 550 (e.g., of a transportation application) for a geographic routing entity that provides a visual indication of a fare corresponding to a fulfilled request, in accordance with an implementation of the disclosure. The GUI window 550 may be displayed to the geographic routing entity after the request has been fulfilled by the geographic routing entity. The GUI window 550 may include information including one or more of a fare order identifier (e.g., Fare—Order ID 3828988), a fixed price amount (e.g., $10), an additional fee (e.g., $5), a daily bonus (e.g., $5), a monthly bonus (e.g., $5), a tip (e.g., $2.17), a total (e.g., $27.17), an amount collected (e.g., $0), and the amount the geographic routing entity will receive (e.g., $27.17). The daily bonus may be in response to the geographic routing entity meeting a first threshold over a first threshold of time (e.g., having fulfilled ten requests that day) and the monthly bonus may be in response to the geographic routing entity meeting a second threshold over a second threshold of time (e.g., having fulfilled one hundred requests the previous month). GUI window 550 may be shown to a geographic routing entity that is collecting a loyalty daily bonus reward.

Figure 6A:
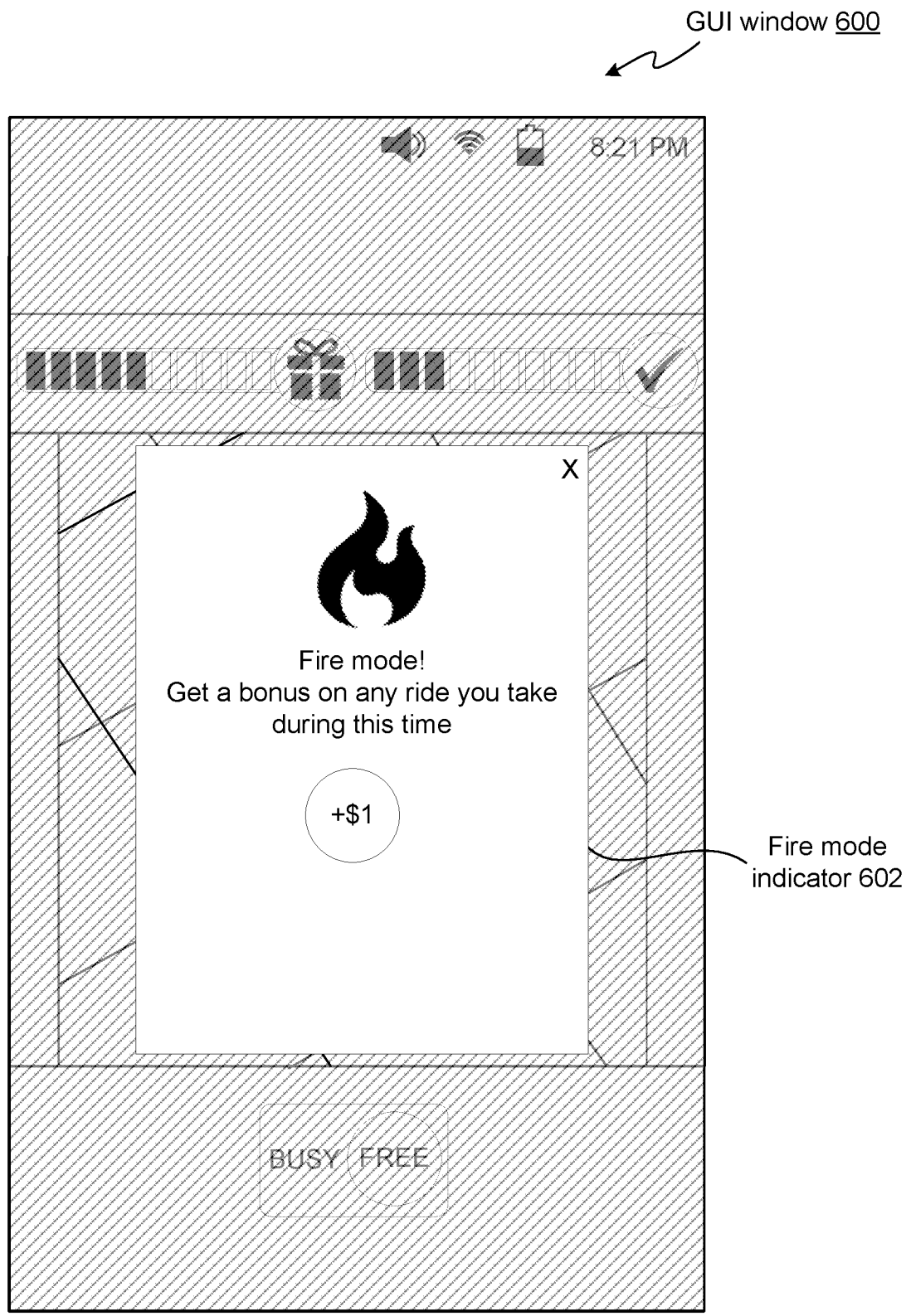
FIGS. 6A-B illustrates example GUIs for a geographic routing entity that provide a visual indication of a bonus mode, in accordance with an implementation of the disclosure.
Figure 6B:
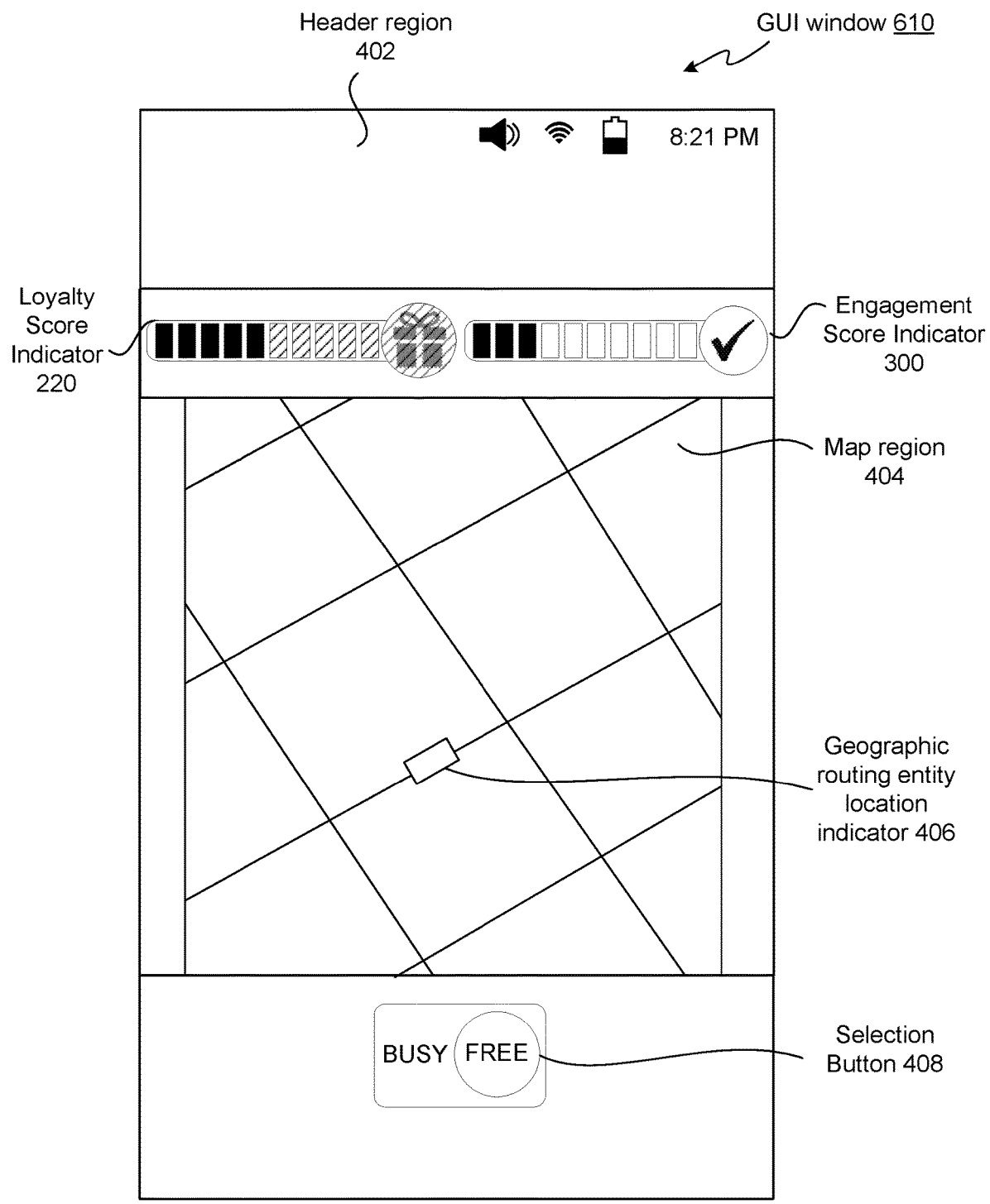

FIGS. 6A-B illustrates example GUIs for a geographic routing entity that provide a visual indication of a bonus mode, in accordance with an implementation of the disclosure. During peak times (as configured via system settings), the loyalty score indicator 210 or 220 can enter a bonus mode (e.g., become loyalty score indicator 230 (see FIG. 2C)). During the bonus mode, the geographic routing entity may be entitled to the daily bonus even if the geographic routing entity has not reached the daily loyalty bonus goal. During this bonus mode time, the geographic routing entities can continue to accumulate rides towards daily and monthly goals of the geographic routing entity.

FIG. 6A illustrates an example GUI window 600 (e.g., of a transportation application) for a geographic routing entity that provides a visual indication of a bonus mode, in accordance with an implementation of the disclosure. GUI window 600 may be provided to a geographic routing entity informing the geographic routing entity that a bonus mode has been entered. GUI window 600 may include a bonus mode indicator 602. The bonus mode indicator 602 may include one or more of an indication that it is currently bonus mode or an amount of bonus that a geographic routing entity would receive for fulfilling a request (e.g., "get a bonus on any ride you take during this time," "+1," etc.). One or more portions of the GUI window 600 other than the bonus mode indicator 602 may be shaded or blurred.

FIG. 6B illustrates an example GUI window 610 (e.g., of a transportation application) for a geographic routing entity that provides a visual indication of loyalty score indicator 230 during bonus mode, in accordance with an implementation of the disclosure. During this bonus mode time, the loyalty score indicator 230 may be visually distinct, such as depicted in FIG. 6B. Use of colors or other specialty visual indications may be implemented to cause the loyalty score indicator 230 to appear visually distinct. In one implementation, the peak times for bonus mode can be configured by the loyalty scorer 116 via a system setting per geographic region and/or per transportation category. In some implementations, there is an option to 'turn on' the bonus mode on demand by a system administrator of the geographic routing system.

In addition to the daily bonus, the loyalty scorer 116 may also calculate and maintain a monthly bonus to encourage geographic routing entities to accept and fulfill more requests (e.g., take more rides) on a monthly basis. Geographic routing entities can be rewarded for fulfilling a second threshold amount of requests per month. Similar to the daily bonus, the loyalty scorer 116 provides the geographic routing entity 1/X (e.g., one out of one hundred, increments by one with a threshold value of one hundred) per each request fulfilled (e.g., ride completed). The number of requests fulfilled to receive the monthly bonus can be a system setting per geographic region and/or per transportation category. There can be a system setting per geographic region for the transportation category to determine if the monthly bonus is enabled or disabled.

When the geographic routing entity has reached the monthly target, the loyalty scorer 116 indicates that the geographic routing entity can receive the monthly bonus. The monthly bonus rewards the geographic routing entity for all fulfilled requests in the following month. The type of bonus can be controlled via the loyalty scorer 116 by a system setting and controlled per transportation category and per geographic area. Examples of month bonuses include, but are not limited to, an extra fee per every ride the following month (calendric), an extra percentage of every additional ride, and/or a fixed sum per that month. The value of the reward may be controlled via a system setting determined per geographic region and/or per transportation category.

As shown in FIG. 5E, the number of requests fulfilled versus the number of requests fulfilled required to reach the monthly bonus may be displayed to the geographic routing entity in progress bar (e.g., loyalty score indicator 220). In addition, as shown in FIG. 5C, the monthly loyalty bonus progress bar (e.g., loyalty score indicator 220) may be displayed to the geographic routing entities within a daily bonus indication 532 (e.g., daily loyalty bonus extra details popup, daily loyalty bonus congratulation popup window, etc.). If the daily loyalty bonus is reached, the loyalty score indicator 200 (e.g., daily loyalty bonus progress bar) may be replaced by the loyalty score indicator 220 (e.g., monthly bonus progress bar) and appear for the rest of the day in the busy and free status windows of the geographic routing entity. If the loyalty score indicator 220 (e.g., monthly progress bar) is displayed, every time the geographic routing entity fulfills a request (i.e., at the end of the ride), the loyalty score indicator gets fuller and/or is incremented to reflect the added fulfilled request and/or an audio indication may be heard. In some implementations, when the geographic routing entity reaches the monthly target (e.g., x/x) a popup may be displayed congratulating the geographic routing entity on their achievement, and showing the geographic routing entity his or her earned reward. After the geographic routing entity has reached the monthly loyalty bonus of the geographic routing entity, the geographic routing entity may see a monthly bonus indicator 544 (e.g., for the duration of the following month) in the icon panel of the incoming requests (e.g., in the header region 402) alongside any other indications relating to the request, such as shown in FIG. 5E.

FIG. 7 is a flow diagram illustrating a method 700 for determining a score for a geographic routing entity of a geographic routing system (e.g., driver of a transportation services organization), in accordance with an implementation of the disclosure. Method 700 may be performed by processing logic that may include hardware (e.g., circuitry, dedicated logic, programmable logic, microcode, etc.), software (such as instructions run on a processing device), firmware, or a combination thereof. In one implementation, the method 700 may be performed by a processing device of transportation server 110. In one implementation, method 700 is performed by engagement scorer 112 of FIG. 1. In other implementations, other devices may perform method 700 (e.g., one or more devices of the system architecture 100).

Referring to FIG. 7, the method 700 begins at block 710 where processing logic determines that an event has occurred to cause calculation of a score of a geographic routing device. The event may be one or more of an available status, an acceptance of a request, ignoring a request, rejecting a request, an offline status, being offline for a threshold amount of time, etc. of a geographic routing entity.

At block 720, the processing logic determines values of one or more input parameters used in the calculation of the score. The input parameters may include one or more of average number of rides given by the identified geographic routing entity per day, acceptances of requests by the identified geographic routing entity per day, ignoring of requests by the identified geographic routing entity per day, rejections of requests by the identified geographic routing entity per day, available status of the identified geographic routing entity per day, busy status of the identified geographic routing entity per day, offline status of the identified geographic routing entity per day, in-ride status of the identified geographic routing entity per day, average number of geographic routing entities who obtain a daily bonus, or correlation of cumulative cost of bonuses to overall rides revenue.

At block 730, the processing logic determines weighted values to apply to each of the one or more input parameters. The weighted values may include one or more of the values shown in engagement score indicator legend 308 of FIG. 3.

At block 740, processing logic calculates the score using the determined weighted values.

At block 750, the processing logic provides a visual indication of the calculated score (e.g., first indicator 302 on engagement score indicator 300) for display to the geographic routing entity via a graphical user interface (GUI).

FIG. 8 is a flow diagram illustrating a method 800 for using an score for engagement-based routing in a geographic routing system according to an implementation of the disclosure. Method 800 may be performed by processing logic that may include hardware (e.g., circuitry, dedicated logic, programmable logic, microcode, etc.), software (such as instructions run on a processing device), firmware, or a combination thereof. In one implementation, the method 800 may be performed by a processing device of transportation server 110. In one implementation, method 800 is performed by engagement-based route determiner 114 of FIG. 1. In other implementations, other devices may perform method 800 (e.g., one or more devices of the system architecture 100).

Method 800 begins at block 810 where processing logic establishes a communication system, over a network between a server computing device, a client computing device, and geographic routing entities. The processing device may provide a geographic routing system for the client computing device and the geographic routing entities.

At block 820, the processing logic receives a request for the geographic routing system from the client computing device.

At block 830, the processing logic identifies geographic routing entities within a determined geographic distance of the client computing device.

At block 840, the processing logic obtains scores and geographic distances from the client computing device. In one implementation, the scores are calculated by method 700 described with respect to FIG. 7. Each of the identified geographic routing entities may correspond to one of the plurality of scores and one of the plurality of geographic distances. Each of the plurality of scores may be based on parameters measuring a level of engagement of a corresponding geographic routing entity with the geographic routing system. The level of engagement may be based on actions of the geographic routing entity.

In one implementation, the processing logic may reset a score after a corresponding geographic routing entity has an offline status for a threshold amount of time (e.g., 5 hours). In one implementation, the processing logic may receive, via the communication session from a geographic routing entity, an acceptance of the request and the processing logic may transmit, via the communication session, data to the geographic routing entity to display an increased score in response to the acceptance. In one implementation, the processing logic may receive, via the communication session from the chosen geographic routing entity, at least one of a first indication that the request is ignored or a second indication that the request is rejected and transmit, via the communication session, data to the chosen geographic routing entity, the data to cause a decreased score to be displayed in response to the at least one of the first indication or the second indication.

At block 850, the processing logic transmits the request to one or more of identified geographic routing entities. The processing logic transmitting the request to the one or more of the plurality of geographic routing entities may be based on the plurality of scores and the plurality of geographic distances.

At block 860, the processing logic receives acceptances of the request from at least a subset of the identified geographic routing entities.

At block 870, the processing logic selects a chosen geographic routing entity from the subset based on the scores and the geographic distances. The processing logic selecting the chosen geographic routing entity from the subset may occur during a period of high demand or low supply of the plurality of geographic routing entities.

Figure 9:
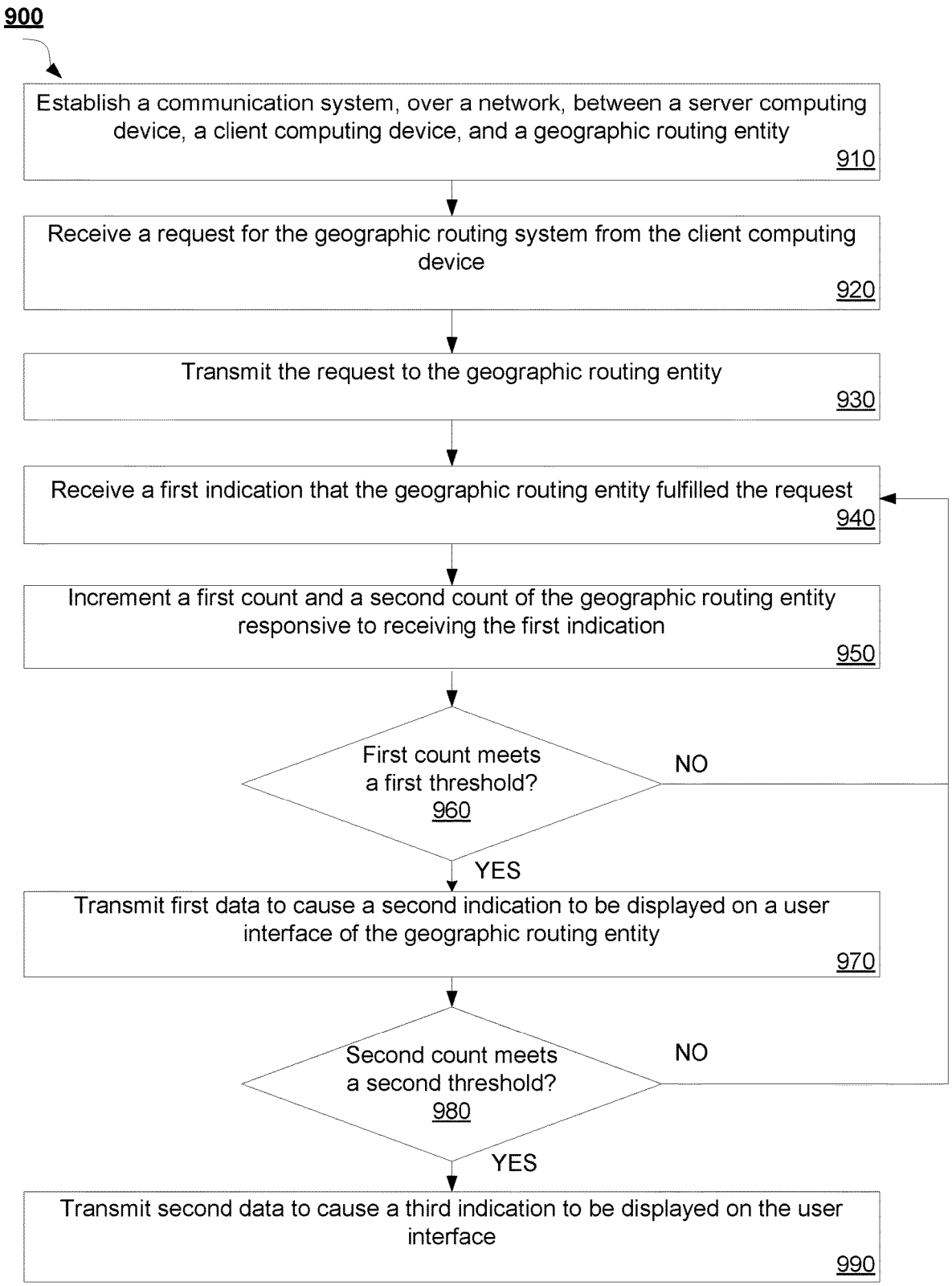
FIG. 9 is a flow diagram illustrating a method for determining a loyalty score for a geographic routing entity of a geographic routing system, in accordance with an implementation of the disclosure.

FIG. 9 is a flow diagram illustrating a method 900 for determining a loyalty score for a geographic routing entity of a geographic routing system, in accordance with an implementation of the disclosure. Method 900 may be performed by processing logic that may include hardware (e.g., circuitry, dedicated logic, programmable logic, microcode, etc.), software (such as instructions run on a processing device), firmware, or a combination thereof. In one implementation, the method 900 may be performed by a processing device of transportation server 110. In one implementation, method 900 is performed by loyalty scorer 116 of FIG. 1. In other implementations, other devices may perform method 900 (e.g., one or more devices of the system architecture 100).

Method 900 begins at block 910 where the processing device establishes a communication system, over a network, between a server computing device, a client computing device, and a geographic routing entity. The processing device may provide a geographic routing system for the client computing device and the geographic routing entity.

At block 920, the processing logic receives a request for the geographic routing system from the client computing device.

At block 930, the processing logic transmits the request to the geographic routing entity.

At block 940, the processing logic receives a first indication that the geographic routing entity fulfilled the request. In one implementation, method 800 of FIG. 8 occurs prior to block 940 (e.g., is part of blocks 910-940 of method 900).

At block 950, the processing logic increments a first count (e.g., over a first period of time (daily), increments the loyalty score indicator 200, etc.) and a second count (e.g., over a second period of time (monthly), increments the loyalty score indicator 220, etc.) of the geographic routing entity (e.g., a loyalty score corresponding to the driver is increased) in response to receiving the first indication.

At decision block 960, the processing logic determines whether the first count meets a first threshold (e.g., whether the loyalty score equals or exceed a daily bonus value). If not, then method 900 returns to block 940. If so, then method 900 proceeds to block 970.

At block 970, the processing logic transmits first data to cause a second indication to be displayed on a user interface of the geographic routing entity (e.g., a daily bonus award is implemented for the driver). The processing device may further implement a daily bonus including giving the daily bonus for each ride given by the geographic routing entity during a calendar day in response to the first count meeting the first threshold value during the calendar day. The processing device may further transmit data to the geographic routing entity to display a daily bonus progress bar (e.g., loyalty score indicator 210) including a first number of rides completed (e.g., requests fulfilled indicator 202) and a second number of rides required (e.g., requests unfulfilled indicator 204) to reach the daily bonus value (e.g., first threshold value). In one implementation, the processing device may further implement the daily bonus for all geographic routing entities in a geographic region responsive to demand of geographic routing entities exceeding a third threshold value in the geographic region or supply of the geographic routing entities being below a fourth threshold value in the geographic region (e.g., a bonus mode, see FIGS. 6A-B).

At decision block 980, the processing logic determines whether the second count meets a second threshold (e.g., the loyalty score equals or exceed a monthly bonus value). If not, then method 900 returns to block 940. If so, then method 900 proceeds to block 990.

At block 990, the processing logic transmits second data to cause a third indication to be displayed on the user interface (e.g., a monthly bonus award is implemented for the driver). The processing device may further implement a monthly bonus including giving the monthly bonus for each ride given by the geographic routing entity during a second calendar month following a first calendar month in response to the second count meeting the second threshold during the first calendar month. The processing device may further transmit data to a geographic routing entity to display a monthly bonus bar (e.g., loyalty score indicator 220) including a first number of rides completed (e.g., requests fulfilled indicator 222) and a second number of rides required (e.g., requests unfulfilled indicator) to reach the monthly bonus value responsive to the loyalty score of the geographic routing entity equaling or exceeding the daily bonus value (e.g., first threshold value during the first interval of time).

Figure 10:
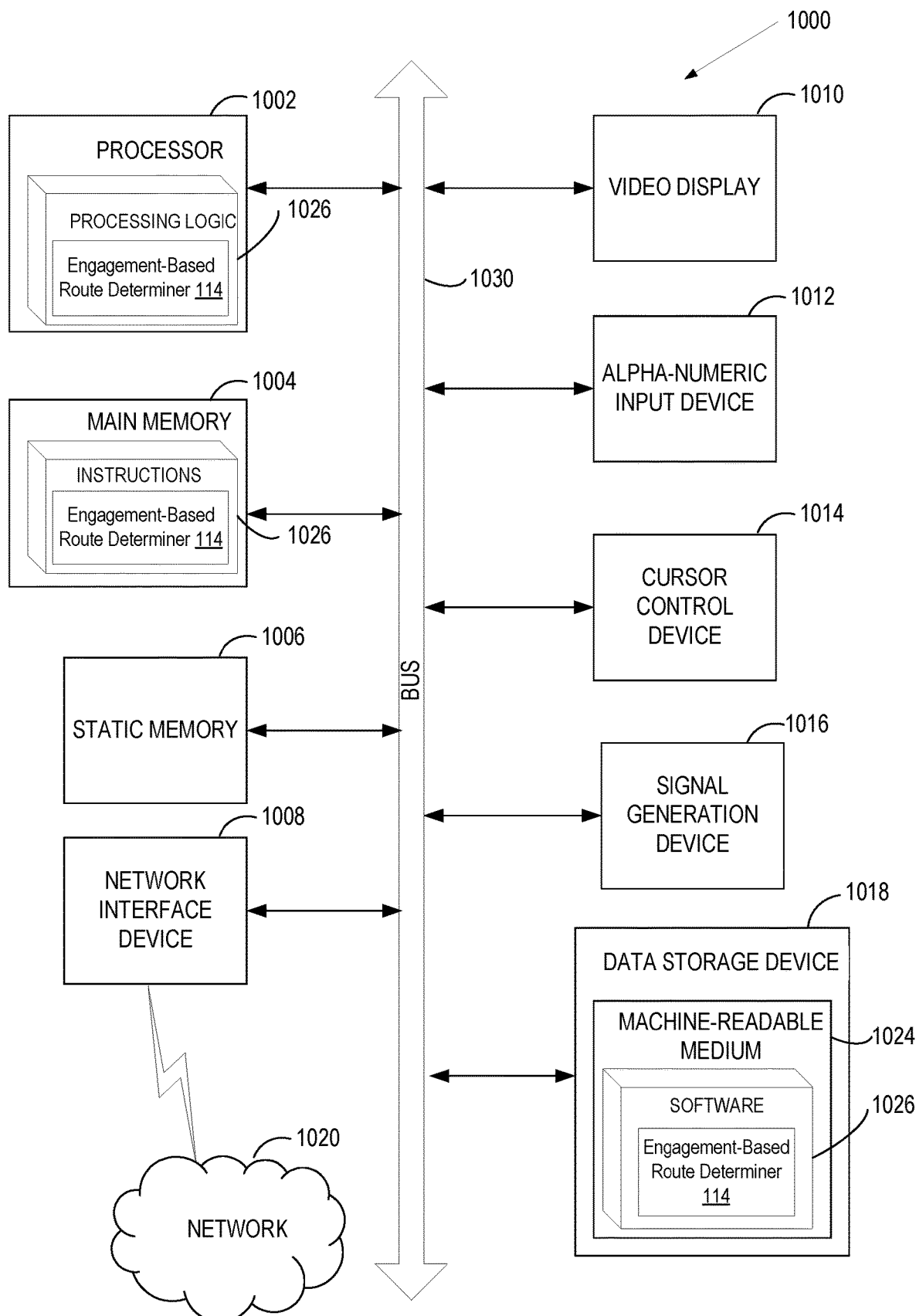
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1008 communicably coupled to a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1024 (e.g., non-transitory machine-readable storage medium) on which is stored software 1026 embodying any one or more of the methodologies of functions described herein. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to implement an engagement-based route determiner 114 to implement engagement-based routing and loyalty programs for a transportation services and/or a software library containing methods that call the above applications, such as engagement-based route determiner 114 described with respect to FIG. 1. While the machine-accessible storage medium 1024 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "attaching," "forwarding," "caching," "referencing," "determining," "establishing," "identifying," "obtaining," "transmitting," "selecting," "incrementing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:

establishing a communication session, over a network, between a server computing device, a client computing device, and a plurality of vehicle computing devices associated with a plurality of geographic routing entities, the server computing device comprising a processing device and providing a geographic routing system for the client computing device and the plurality of vehicle computing devices;

receiving, by the processing device via the communication session from the client computing device, a transportation request for the geographic routing system, wherein the transportation request comprises a location of the client computing device;

identifying, by the processing device, ones of the plurality of geographic routing entities that have a corresponding driver location within a determined geographic distance of the location of the client computing device;

obtaining, by the processing device, a plurality of driver scores and a plurality of geographic distances from the location of the client computing device, each of the identified geographic routing entities corresponding to one of the plurality of driver scores and one of the plurality of geographic distances, wherein each of the plurality of driver scores is based on parameters measuring a level of engagement of a corresponding geographic routing entity with the geographic routing system, wherein the level of engagement is based on interactions of the corresponding geographic routing entity with the geographic routing system;

transmitting, by the processing device via the communication session, the transportation request to a corresponding vehicle computing device of each of one or more of the identified geographic routing entities;

receiving, by the processing device via the communication session, acceptances of the transportation request from the corresponding vehicle computing device of each of at least a subset of the identified geographic routing entities;

selecting, by the processing device, a chosen geographic routing entity from the subset based on the plurality of driver scores and the plurality of geographic distances;

receiving, from a first vehicle computing device associated with a first geographic routing entity, at least one of a first indication that the transportation request is ignored or a second indication that the transportation request is rejected; and transmitting first data to the first vehicle computing device associated with the first geographic routing entity, the first data to cause a decreased driver score to be displayed via the first vehicle computing device in response to the at least one of the first indication or the second indication.

2. The method of claim 1 further comprising prefetching, by the processing device, second data from main memory to store in temporary storage, wherein the second data is associated with the identified geographic routing entities based on the plurality of geographic distances from the location of the client computing device, wherein the transmitting the transportation request to the corresponding vehicle computing device of each of the one or more of the plurality of geographic routing entities is based on based on the prefetched second data stored in the temporary storage, the plurality of driver scores, and the plurality of geographic distances.

3. The method of claim 1, wherein the selecting of the chosen geographic routing entity from the subset occurs during a period of high demand or low supply of the plurality of geographic routing entities.

4. The method of claim 1, wherein obtaining a driver score for an identified geographic routing entity is based on one or more of:
   average number of rides given by the identified geographic routing entity per day;
   acceptances of first transportation requests by the identified geographic routing entity per day;
   ignoring of second transportation requests by the identified geographic routing entity per day;
   rejections of third transportation requests by the identified geographic routing entity per day;
   available status of the identified geographic routing entity per day;
   busy status of the identified geographic routing entity per day;
   offline status of the identified geographic routing entity per day;
   in-ride status of the identified geographic routing entity per day;
   average number of geographic routing entities who obtain a daily bonus; or
   correlation of cumulative cost of bonuses to overall rides revenue.

5. The method of claim 1, wherein a driver score is reset after the corresponding geographic routing entity has an offline status for a threshold amount of time.

6. The method of claim 1 further comprising:
   receiving, via the communication session from a second vehicle computing device associated with a second geographic routing entity, an acceptance of the transportation request; and
   transmitting, via the communication session, second data to the second vehicle computing device associated with the second geographic routing entity to display an increased driver score in response to the acceptance.

7. A non-transitory machine-readable storage medium including instructions that, when accessed by a processing device of a server computing device, cause the processing device to perform operations comprising:
   establishing a communication session, over a network, between the server computing device, a client computing device, and a plurality of vehicle computing devices associated with a plurality of geographic routing entities, the server computing device providing a geographic routing system for the client computing device and the plurality of vehicle computing devices;
   receiving, via the communication session from the client computing device, a transportation request for the geographic routing system, wherein the transportation request comprises a location of the client computing device;
   identifying ones of the plurality of geographic routing entities that have a corresponding driver location within a determined geographic distance of the location of the client computing device;
   obtaining a plurality of driver scores and a plurality of geographic distances from the location of the client computing device, each of the identified geographic routing entities corresponding to one of the plurality of driver scores and one of the plurality of geographic distances, wherein each of the plurality of driver scores is based on parameters measuring a level of engagement of a corresponding geographic routing entity with the geographic routing system, wherein the level of engagement is based on interactions of the corresponding geographic routing entity with the geographic routing system;
   transmitting, via the communication session, the transportation request to a corresponding vehicle computing device of each of one or more of the identified geographic routing entities;
   receiving, via the communication session, acceptances of the transportation request from the corresponding vehicle computing device of each of at least a subset of the identified geographic routing entities;
   selecting a chosen geographic routing entity from the subset based on the plurality of driver scores and the plurality of geographic distances;
   receiving, from a first vehicle computing device associated with a first geographic routing entity, at least one of a first indication that the transportation request is ignored or a second indication that the transportation request is rejected; and
   transmitting first data to the first vehicle computing device associated with the first geographic routing entity, the first data to cause a decreased driver score to be displayed via the first vehicle computing device in response to the at least one of the first indication or the second indication.

8. The non-transitory machine-readable storage medium of claim 7, wherein the transmitting the transportation request to the corresponding vehicle computing device of each of the one or more of the plurality of geographic routing entities is based on the plurality of driver scores and the plurality of geographic distances.

9. The non-transitory machine-readable storage medium of claim 7, wherein the selecting of the chosen geographic routing entity from the subset occurs during a period of high demand or low supply of the plurality of geographic routing entities.

10. The non-transitory machine-readable storage medium of claim 7, wherein obtaining a driver score for an identified geographic routing entity is based on one or more of:

average number of rides given by the identified geographic routing entity per day;
acceptances of first transportation requests by the identified geographic routing entity per day;
ignoring of second transportation requests by the identified geographic routing entity per day;
rejections of third transportation requests by the identified geographic routing entity per day;
available status of the identified geographic routing entity per day;
busy status of the identified geographic routing entity per day;
offline status of the identified geographic routing entity per day;
in-ride status of the identified geographic routing entity per day;
average number of geographic routing entities who obtain a daily bonus; or
correlation of cumulative cost of bonuses to overall rides revenue.

11. The non-transitory machine-readable storage medium of claim 7, wherein a driver score is reset after the corresponding geographic routing entity has an offline status for a threshold amount of time.

12. The non-transitory machine-readable storage medium of claim 7, the operations further comprising:
receiving, via the communication session from a second vehicle computing device associated with a second geographic routing entity, an acceptance of the transportation request; and
transmitting, via the communication session, second data to the second vehicle computing device associated with the second geographic routing entity to display an increased driver score in response to the acceptance.

13. An apparatus comprising:
a memory;
a processing device, coupled to the memory, the processing device to:
establish a communication session, over a network, between the processing device, a client computing device, and a plurality of vehicle computing devices associated with a plurality of geographic routing entities, the processing device providing a geographic routing system for the client computing device and the plurality of vehicle computing devices;
receive, via the communication session from the client computing device, a transportation request for the geographic routing system, wherein the transportation request comprises a location of the client computing device;
identify ones of the plurality of geographic routing entities that have a corresponding driver location within a determined geographic distance of the client computing device;
obtain a plurality of driver scores and a plurality of geographic distances from the location of the client computing device, each of the identified geographic routing entities corresponding to one of the plurality of driver scores and one of the plurality of geographic distances, wherein each of the plurality of driver scores is based on parameters measuring a level of engagement of a corresponding geographic routing entity with the geographic routing system, wherein the level of engagement is based on interactions of the corresponding geographic routing entity with the geographic routing system;
transmit, via the communication session, the transportation request to a corresponding vehicle computing device of each of one or more of the identified geographic routing entities;
receive, via the communication session, acceptances of the transportation request from the corresponding vehicle computing device of each of at least a subset of the identified geographic routing entities;
select a chosen geographic routing entity from the subset based on the plurality of driver scores and the plurality of geographic distances;
receive, from a first vehicle computing device associated with a first geographic routing entity, at least one of a first indication that the transportation request is ignored or a second indication that the transportation request is rejected; and
transmit first data to the first vehicle computing device associated with the first geographic routing entity, the first data to cause a decreased driver score to be displayed via the first vehicle computing device in response to the at least one of the first indication or the second indication.

14. The apparatus of claim 13, wherein the processing device is to transmit the transportation request to the corresponding vehicle computing device of each of the one or more of the plurality of geographic routing entities based on the plurality of driver scores and the plurality of geographic distances.

15. The apparatus of claim 13, wherein the processing device is to select the chosen geographic routing entity from the subset occurs during a period of high demand or low supply of the plurality of geographic routing entities.

16. The apparatus of claim 13, wherein the processing device is to obtain a driver score for an identified geographic routing entity based on one or more of:
average number of rides given by the identified geographic routing entity per day;
acceptances of first transportation requests by the identified geographic routing entity per day;
ignoring of second transportation requests by the identified geographic routing entity per day;
rejections of third transportation requests by the identified geographic routing entity per day;
available status of the identified geographic routing entity per day;
busy status of the identified geographic routing entity per day;
offline status of the identified geographic routing entity per day;
in-ride status of the identified geographic routing entity per day;
average number of geographic routing entities who obtain a daily bonus; or
correlation of cumulative cost of bonuses to overall rides revenue.

17. The apparatus of claim 13, wherein a driver score is reset after the corresponding geographic routing entity has an offline status for a threshold amount of time.

18. The apparatus of claim 13, wherein the processing device is further to:
receive, via the communication session from a second vehicle computing device associated with a second geographic routing entity, an acceptance of the transportation request; and
transmit, via the communication session, second data to the second vehicle computing device associated with the second geographic routing entity to display an increased driver score in response to the acceptance.

* * * * *